United States Patent [19]
Yoshida et al.

[11] Patent Number: 5,680,188
[45] Date of Patent: Oct. 21, 1997

[54] A REFLECTIVE LIQUID CRYSTAL DISPLAY DEVICE

[75] Inventors: Tetsushi Yoshida, Sagamiko-machi; Jiro Takei, Tama; Zenta Kikuchi, Hamura, all of Japan

[73] Assignee: Casio Computer Co., Ltd., Tokyo, Japan

[21] Appl. No.: 594,380

[22] Filed: Jan. 30, 1996

Related U.S. Application Data

[63] Continuation of Ser. No. 254,034, Jun. 3, 1994, abandoned.

[30] Foreign Application Priority Data

| Jun. 7, 1993 | [JP] | Japan | 5-136028 |
| Jun. 29, 1993 | [JP] | Japan | 5-158438 |
| Oct. 14, 1993 | [JP] | Japan | 5-256958 |
| Oct. 14, 1993 | [JP] | Japan | 5-256960 |

[51] Int. Cl.$^6$ .................. G02F 1/1335; C09K 19/50
[52] U.S. Cl. .................. 349/113; 349/71; 349/164
[58] Field of Search .................. 359/50, 70, 97, 359/51, 52; 349/71, 89, 86, 113, 164, 163

[56] References Cited

U.S. PATENT DOCUMENTS

| 3,998,526 | 12/1976 | Katz | 359/70 |
| 4,097,131 | 6/1978 | Nishiyama | 359/70 |
| 4,190,329 | 2/1980 | Washizuka et al. | 359/70 |
| 4,209,106 | 6/1980 | Oh | 359/97 |
| 4,367,923 | 1/1983 | Ishikawa | 359/49 |
| 4,394,068 | 7/1983 | Pape et al. | 359/70 |
| 4,425,029 | 1/1984 | Funada et al. | 359/70 |
| 4,556,287 | 12/1985 | Funada et al. | 359/70 |
| 4,688,900 | 8/1987 | Doane et al. | 359/52 |
| 4,799,776 | 1/1989 | Yamazaki et al. | 359/70 |
| 4,813,768 | 3/1989 | Hamaguchi et al. | 359/70 |
| 4,842,379 | 6/1989 | Oishi et al. | 359/67 |
| 5,113,270 | 5/1992 | Fergason | 359/51 |
| 5,121,237 | 6/1992 | Ikeda et al. | 359/67 |
| 5,146,355 | 9/1992 | Prince et al. | 359/50 |
| 5,148,297 | 9/1992 | Ishii et al. | 359/53 |
| 5,194,973 | 3/1993 | Isogai et al. | 359/51 |
| 5,206,747 | 4/1993 | Wiley et al. | 359/70 |
| 5,264,952 | 11/1993 | Fukatani et al. | 359/53 |
| 5,321,539 | 6/1994 | Hirabayshi et al. | 359/70 |
| 5,477,351 | 12/1995 | Takahara et al. | 359/40 |
| 5,499,121 | 3/1996 | Brewer | 359/51 |
| 5,530,566 | 6/1996 | Kumar | 359/21 |

FOREIGN PATENT DOCUMENTS

| 0-125015 | 7/1983 | Japan | 359/70 |
| 3-175420 | 7/1991 | Japan | 359/70 |
| 5-173116 | 7/1993 | Japan | 359/70 |
| 2-013954 | 8/1979 | United Kingdom | 359/50 |

OTHER PUBLICATIONS

Baur et al, "Fluorescent–activated liquid crystal display", Apr. 1977 Applied Physics Letters, vol.31, No. 1, 1 Jul. 1977.

*Primary Examiner*—William L. Sikes
*Assistant Examiner*—Toan Ton
*Attorney, Agent, or Firm*—Frishauf, Holtz, Goodman, Langer & Chick

[57] ABSTRACT

A polymer dispersed liquid crystal display device includes first and second substrates arranged to oppose each other, a polymer dispersed liquid crystal layer arranged between the first and second substrates, first electrodes arranged on the inner surface of the first substrate, a reflecting member arranged on the inner surface of the second substrate and designed to reflect light transmitted through the polymer dispersed liquid crystal layer, a coloring film for coloring light transmitted through the polymer dispersed liquid crystal to display a color image, and second electrodes arranged between the inner surface of the second substrate and the liquid crystal layer. At least a portion of each second electrode opposes a corresponding first electrode. A light coloring film is arranged on the reflecting member, contains a fluorescent material, and converts light transmitted through the polymer dispersed liquid crystal layer into light having the same color as that of fluorescent light emitted from the fluorescent material.

20 Claims, 14 Drawing Sheets

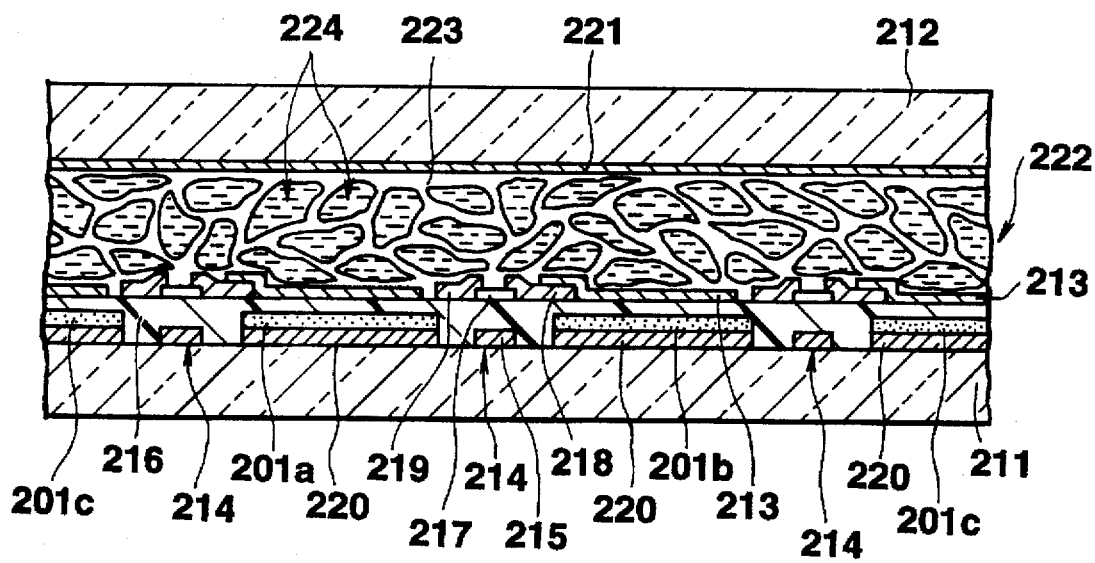
FIG.10
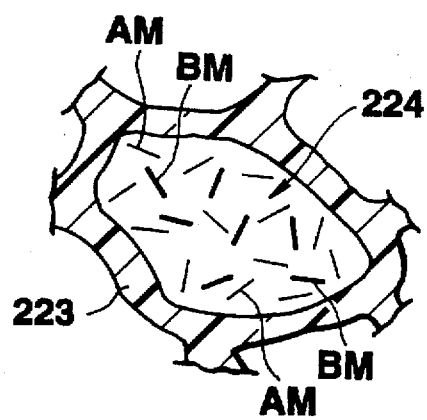 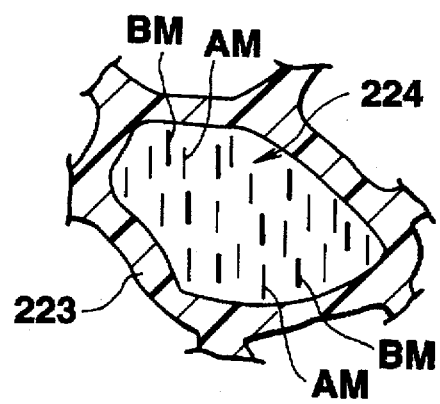
FIG.11A      FIG.11B

A REFLECTIVE LIQUID CRYSTAL DISPLAY DEVICE

This is a Continuation of application Ser. No. 08/254,034, filed Jun. 3, 1994, now abandoned.

BACKGROUND OF THE INVENTION

1. Field of the Invention

The present invention relates to a liquid crystal display device and, more particularly, to a reflection liquid crystal display device which can provide a bright display and obtain a clear image.

2. Description of the Related Art

FIG. 1 is a sectional view showing a polymer dispersed liquid crystal display device of a simple matrix type. As shown in FIG. 1, the polymer dispersed liquid crystal display apparatus comprises: a transparent substrate 11 having signal electrodes 13 formed thereon; a substrate 12 having scanning electrodes 14 formed thereon; a frame-like seal member 15 for joining the substrates 11 and 12 to each other; and a polymer dispersed liquid crystal layer (to be referred to as a composite film) 16 composed of a liquid crystal and a polymer resin, which is arranged in a region surrounded by the transparent substrates 11 and 12 and the seal member 15.

The composite film 16 has a structure in which aggregates of the liquid crystal (liquid crystal domains) are dispersed in the polymer resin layer. Note that a nematic liquid crystal having positive dielectric anisotropy is generally used as a liquid crystal.

The polymer dispersed liquid crystal display device is driven by applying a voltage between the opposing signal and scanning electrodes 13 and 14. While no voltage is applied between the opposing signal and scanning electrodes 13 and 14, no electric field is applied to the liquid crystal, and the liquid crystal molecules in the liquid crystal domains dispersed in the composite film 16 point in various directions. In this state, light transmitted through the composite film 16 is scattered by the light scattering effect of the composite film 16.

When a voltage exceeding a predetermined threshold value is applied between the signal and scanning electrodes 13 and 14, an electric field is applied to the liquid crystal molecules in each liquid crystal domain. As a result, the liquid crystal molecules are aligned in a direction substantially perpendicular to the major surfaces of the substrates 11 and 12. In this state, light is transmitted through the composite film 16 under almost no influence of the light scattering effect.

As described above, the polymer dispersed liquid crystal display device is designed to display an image by controlling scattering and transmission of light. Pixels constituted by the intersections between the signal and scanning electrodes 13 and 14 are displayed with hazy light based on scattering of light while no electric field is applied, and are displayed with transmitted light having a high luminance while electric field is applied. For this reason, the polymer dispersed liquid crystal display device need not use a polarizing plate having a low transmittance and hence can provide a brighter image than a TN type liquid crystal display device.

As shown in FIG. 1, owing to this advantage, the polymer dispersed liquid crystal display device is generally used as a reflection device having a reflecting plate 17.

However, the conventional polymer dispersed liquid crystal display device has the following drawbacks.

(1) The conventional reflection type polymer dispersed liquid crystal display device is designed such that incident light emerges from the substrate 11 after it is transmitted through each of the substrates 11 and 12 twice. For this reason, a decrease in light amount is large owing to light absorption in the substrates 11 and 12, and a display becomes dark accordingly.

(2) when the conventional polymer dispersed liquid crystal display device is to be used as a color display device, a color filter as a coloring film is arranged for each pixel, and a color image is displayed by coloring light transmitted through each pixel. However, since each color filter greatly absorbs light, a display becomes considerably dark, especially in a reflection liquid crystal display device because light is transmitted through each color filter twice.

(3) In the conventional polymer dispersed liquid crystal display device, the brightness of a display is low when obliquely seen, and a peripheral portion of a display image becomes unclear. Consequently, a high-quality image cannot be obtained.

This drawback will be described in detail with reference to FIG. 2. When a display of the polymer dispersed liquid crystal display device is squarely seen, each ON pixel displayed upon application of an electric field is seen in a full size. However, when this liquid crystal display device is obliquely seen as indicated by arrows in FIG. 2, an actually seen region AB does not coincide with a bright region (a region on which light transmitted through the composite film 16 is incident) AA of the reflecting film 17. For this reason, of the bright area AA, a region W1 is not seen, but only a region AC is seen. Therefore, each pixel is seen as if a portion thereof is omitted, and a display image becomes dark, resulting in a decrease in contrast. In addition, the observer can also see a non-display region W2. A non-display region, which is intended to be a dark region, becomes slightly dark owing to scattered light entering from an adjacent bright region upon scattering of the light at the composite film 16. As a result, a dim portion adjacent to an ON (bright) pixel is seen, resulting in blurring of the display image.

(4) As shown in FIG. 3, some conventional reflection type polymer dispersed liquid crystal display device has a light-shielding film 18 called a black mask on each non-display region on the outer surface of a front-side substrate 11. The light-shielding film 18 serves to shield light transmitted through each non-display region so as to display a clearer image as a whole. The light-shielding film 18, however, makes a display darker and blurs a display-image. This point will be described in detail with reference to FIG. 3. When the liquid crystal display device shown in FIG. 3 is obliquely seen as indicated by arrows, an actually seen region AB deviates from a bright region AA on the reflecting film 17. As a result, a portion of the bright region AA is obstructed by the light-shielding film 18, and only a region AC of the bright region AA is seen by the observer. For this reason, a region W1 is omitted from each pixel, and the display image becomes dark, resulting in a decrease in contrast. In addition, although a non-display region W2 can be seen by the observer, the non-display region W2 is made to be slightly bright owing to scattered light entering from an adjacent display region. Therefore, a dim portion adjacent to each ON pixel is seen, and the display image is blurred.

SUMMARY OF THE INVENTION

It is the first object of the present invention to provide a liquid crystal display device which can display a bright image.

It is the second object of the present invention to provide a liquid crystal display device which can obtain a clear display image.

In order to achieve the above objects, according to the first aspect of the present invention, there is provided a liquid crystal display device comprising:

first and second substrates having opposing inner surfaces and arranged at a predetermined distance from each other;

a liquid crystal layer, arranged between the first and second substrates, for controlling scattering and transmission of light;

a first electrode arranged on the side of the inner surface of the first substrate;

a second electrode arranged between the second substrate and the liquid crystal layer and having at least a portion opposing the first electrode; and a reflecting member, arranged between the second substrate and the liquid crystal layer, for reflecting light transmitted through the liquid crystal layer.

According to the above arrangement, since the reflecting member is arranged not on the outer surface side but on the inner surface side of the second substrate, light incident on the first substrate side does not pass through the second substrate. For this reason, the incident light is free from attenuation caused when it passes through the second substrate. Hence, a bright image can be displayed.

In addition, since the reflecting member is arranged on the inner surface side of the second substrate, the distance from the surface (in contact with the first substrate) of the liquid crystal layer to the reflecting member is shorter than that in the case wherein the reflecting member is arranged on the outer surface side. If the distance from the surface of the liquid crystal layer to the reflecting member is short, the deviation between a bright region (a region on which light transmitted through the liquid crystal layer is incident) of the reflecting member and an actually seen region is small when a display is obliquely seen. For this reason, the omission of each display pixel is reduced. That is, even when the screen is obliquely seen, a display with a quality similar to a display quality obtained when the screen is squarely seen can be obtained. Therefore, a bright display can be obtained when obliquely observed, and blurring of a peripheral portion of each pixel can be prevented.

According to the second aspect of the present invention, there is provided a liquid crystal display device comprising:

first and second substrates having opposing inner surfaces and arranged at a predetermined distance from each other;

a liquid crystal layer, arranged between the first and second substrates, for controlling scattering and transmission of light;

a first electrode arranged on the side of the inner surface of the first substrate;

a second electrode arranged between an inner surface of the second substrate and the liquid crystal layer and having at least a portion opposing the first electrode; and a fluorescent film arranged between the second substrate and the liquid crystal layer and composed of a film containing a fluorescent material.

The fluorescent film absorbs light having a wavelength other than a predetermined wavelength and emits fluorescent light having a predetermined wavelength by using the energy of the absorbed light. For this reason, a display color obtained by this liquid crystal display device is the color of this fluorescent light. This fluorescent film is not designed to color light by transmitting light having a predetermined wavelength and absorbing light having other wavelengths, but is designed to emit fluorescent light by using the energy of absorbed light. Light colored by the fluorescent film has an intensity higher than that of light colored by a color filter or the like. Therefore, a bright color image can be displayed.

In addition, with the use of a reflecting plate, this device can also be used as a reflection color liquid crystal display device.

If the fluorescent film contains a fluorescentescent material, an image can be displayed with light emitted from the fluorescentescent material even when no light is incident on the liquid crystal display device.

If the fluorescent film contains a material (a pigment or the like) which transmits light with a wavelength band including the wavelength of fluorescent light emitted from the fluorescent film, and absorbs light with other wavelength bands, the chromatic purity of colored light can be improved.

Similarly, if the liquid crystal contains a material (a die or the like) which transmits light with a wavelength band including the wavelength of fluorescent light emitted from the fluorescent film, and absorbs light with other wavelength bands, the chromatic purity of colored light can be improved.

According to the third aspect of the present invention, there is provided a liquid crystal display device comprising:

a first transparent substrate;

a second transparent substrate arranged to oppose the first transparent substrate and composed of a transparent film;

a liquid crystal layer, arranged between the first and second transparent substrates, for controlling scattering and transmission of light;

a first electrode arranged on the inner surface of the first transparent substrate;

a second electrode arranged on the inner surface of the second transparent substrate; and a reflecting member arranged on the outer surface of the second substrate.

According to the above arrangement, the transparent film is very thin as compared with a glass substrate or the like. Therefore, the distance from the surface (in contact with the first substrate) of the liquid crystal layer to the reflecting member can be shortened. If the distance from the surface of the liquid crystal layer to the reflecting member is short, the deviation between a bright region (a region on which light transmitted through the liquid crystal layer is incident) of the reflecting member and an actually seen region is small when a display is obliquely seen. As a result, the omission of each display pixel is reduced. That is, even when the screen is obliquely seen, a display with a quality similar to a display quality obtained when the screen is squarely seen can be obtained. Therefore, a bright display can be obtained when obliquely observed, and blurring of a peripheral portion of each pixel can be prevented.

In addition, by arranging a hard protective plate on the outer surface of the reflecting member, the strength of the device can be improved without degrading the display characteristics.

According to the fourth aspect of the present invention, there is provided a liquid crystal display device comprising:

first and second transparent substrates arranged to oppose each other;

a liquid crystal layer, arranged between the first and second transparent substrates, for controlling scattering and transmission of light;

a first electrode arranged on the inner surface of the first transparent substrate;

a second electrode arranged on the inner surface of the second transparent substrate;

a reflecting member arranged on the second substrate; and a light-shielding film, arranged in a non-display region on the inner surface of the first substrate, for shielding light, the non-display region including a portion other than a portion where the first and second electrodes oppose each other.

According to the above arrangement, since the light-shielding film is arranged on the inner surface of the first substrate, the distance from the light-shielding film to the reflecting member is shorter than that in the conventional liquid crystal display device by the thickness of the first substrate. For this reason, the deviation between a bright region of the reflecting member and an actually seen region is small when a display is obliquely seen. Therefore, even when the screen is obliquely seen, a display with a quality similar to a display quality obtained when the screen is squarely seen can be obtained. That is, a bright display can be obtained when obliquely observed, and blurring of a peripheral portion of each pixel can be prevented.

According to the fifth aspect of the present invention, there is provided a liquid crystal display device comprising:

a first substrate having a thickness of not more than 0.7 mm;

a second substrate arranged to oppose the first substrate;

a liquid crystal layer, arranged between the first and second substrates, for controlling scattering and transmission of light;

a first electrode arranged on an inner surface of the first substrate;

a second electrode arranged on an inner surface of the second substrate;

a reflecting member arranged on the second substrate; and a light-shielding film, arranged in a non-display region on an outer surface of the first substrate, for shielding light, the non-display region including a portion other than a portion where the first and second electrodes oppose each other.

According to the above arrangement, since the first substrate is thin, the distance from the light-shielding film to the reflecting member is shorter than that in the conventional liquid crystal display device. For this reason, the deviation between a bright region of the reflecting member and an actually seen region is small when a display is obliquely seen. Therefore, even when the screen is obliquely seen, a display with a quality similar to a display quality obtained when the screen is squarely seen can be obtained. That is, a bright display can be obtained when obliquely observed, and blurring of a peripheral portion of each pixel can be prevented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 10 is a sectional view showing a case wherein a light coloring film of the second embodiment is applied to a polymer dispersed liquid crystal display device;

FIGS. 11A and 11B are sectional views for explaining the aligned states of liquid crystal molecules and the molecules of a two-tone dye in the absence and presence of an electric field, respectively;

DETAILED DESCRIPTION OF THE PREFERRED EMBODIMENTS

Liquid crystal display devices according to embodiments of the present invention will be described in detail below with reference to the accompanying drawings.

[First Embodiment]

Figure 4:
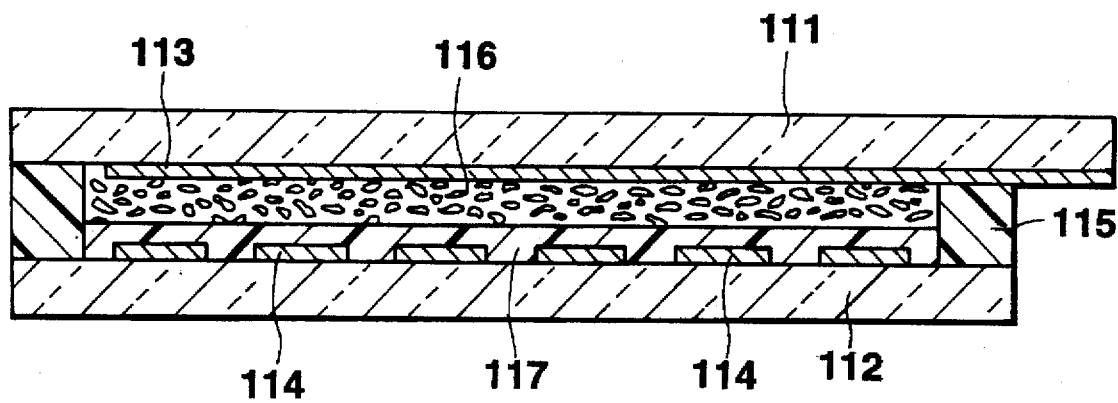
FIG. 4 is a sectional view showing a polymer dispersed liquid crystal display device according to the first embodiment of the present invention.
Figure 5:
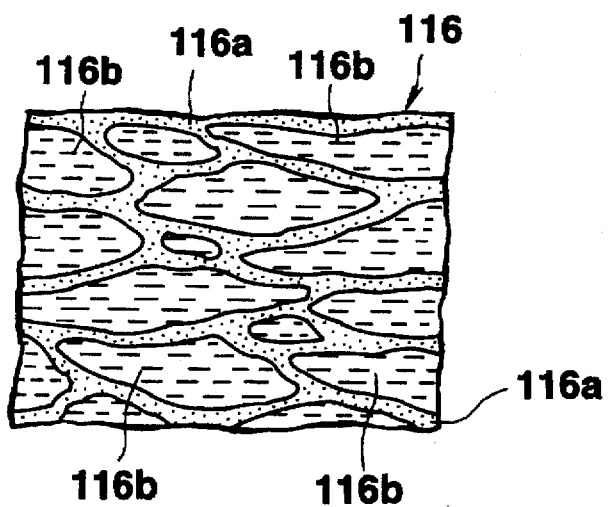
FIG. 5 is an enlarged sectional view of a composite film composed of a liquid crystal and a polymer resin in FIG. 4.

FIG. 4 is a sectional view of a polymer dispersed liquid crystal display device according to the first embodiment of the present invention. FIG. 5 is an enlarged sectional view of a portion of a composite film (a polymer dispersed liquid crystal layer) composed of a liquid crystal and a polymer resin.

This polymer dispersed liquid crystal display device comprises: a pair of front- and rear-side substrates 111 and 112; a sealing member 115 for joining the substrates 111 and 112 to each other; and a composite film 116 composed of a liquid crystal and a polymer resin and arranged in a region surrounded by the substrates 111 and 112 and the sealing member 115. 5 Scanning electrodes 113 for applying a voltage to the composite film 116 are formed on the inner surface (opposing the composite film 116) of the front-side substrate (the upper substrate in FIG. 4) 111. Signal electrodes 114 for applying a voltage to the composite film 116 and a reflecting film 117 for reflecting light are formed on the inner surface of the rear- or back-side substrate (the lower substrate in FIG. 4) 112.

The front-side substrate 111 is a transparent substrate consisting of glass or the like. Each scanning electrode 113 is composed of a transparent conductive film such as ITO (indium tin oxide) film.

For example, the rear-side substrate 112 consists of glass or the like. Each signal electrode 114 is composed of a low-resistance metal film such as an Al (aluminum) film. The reflecting film 117 is formed on the electrodes 114 throughout almost the entire surface of the rear-side substrate 112. The reflecting film 117 is made of an insulating film, e.g., a resin film containing a fluorescent pigment.

The composite film 116 is formed by dispersing liquid crystal domains in a polymer resin. As shown in FIG. 5, the composite film 116 has a structure in which a liquid crystal 116b is confined in spaces or voids in a polymer resin 116a having a sponge-like sectional structure.

The operation of the polymer dispersed liquid crystal display device having the arrangement shown in FIG. 5 will be described next.

This polymer dispersed liquid crystal display device is driven by applying a voltage between the scanning and signal electrodes 113 and 114. While no voltage is applied between the electrodes 113 and 114, the molecules of the liquid crystal 116b in the respective liquid crystal domains dispersed in the polymer resin point in various directions. In this state, light transmitted through the composite film 116 is scattered by the interface between the liquid crystal and the polymer resin and by the liquid crystal. As a result, a display on a non-voltage applied portion becomes hazy.

When a voltage equal to or higher than a predetermined threshold value is applied between the electrodes 113 and 114, the liquid crystal molecules in the respective liquid crystal domains are uniformly aligned in a direction almost perpendicular to the surfaces of the substrates 111 and 112. For this reason, light is transmitted through the composite film 116 under almost no influence of the light scattering effect. As a result, a display on a voltage applied portion has the same color as that of light reflected by the reflecting film 117. Since a resin film containing a fluorescent pigment is used as the reflecting film 117, the color of a display on a voltage applied portion is the color of fluorescent light emitted from the fluorescent pigment.

According to this polymer dispersed liquid crystal display device, therefore, scattering and reflection of incident light can be controlled to display an arbitrary image by controlling the signals supplied to the scanning and signal electrodes 113 and 114 and also controlling the electric field applied to the composite film 116.

In this polymer dispersed liquid crystal display device, since the reflecting film 117 is formed on the inner surface of the rear-side substrate 112, light transmitted through the front-side substrate 111 and the composite film 116 is reflected by the reflecting film 117 without passing through the rear-side substrate 112. For this reason, in the polymer dispersed liquid crystal display device of this embodiment, a reduction in light amount due to optical absorption occurs only in the front-side substrate 111. Therefore, the reduction in light amount is small, and a bright display can be obtained.

In addition, since the reflecting film 117 is arranged on the inner surface of the rear-side substrate 112, the distance from the surface (in contact with the front-side substrate 111) of the composite film 116 to the reflecting film 117 is short. For this reason, the deviation between an actually seen region and a bright region (a region on which Light transmitted through the composite film 116 is incident) on the reflecting film 117 is small when the liquid crystal display device is obliquely seen. Therefore, a bright display can be obtained when obliquely observed, and blurring of a peripheral portion of each pixel can be prevented.

In this polymer dispersed liquid crystal display device, since incident light passes through the composite film 116 twice, light passing through a non-voltage applied portion is scattered twice, resulting in an increase in the degree of haziness. In addition, a display on a voltage applied portion is a bright display owing to fluorescent light. Therefore, the device of the embodiment can obtain a display with contrast higher than that of a display obtained by the conventional reflection device.

In this embodiment, since the reflecting film 117 is composed of a resin film containing a fluorescent pigment, light reflected by the reflecting film 117 is colored, and a bright color display can be obtained. For example, the polymer dispersed liquid crystal display device of the above arrangement is manufactured as follows. First, the front-side substrate 111 having the scanning electrodes 113 formed thereon is joined to the rear-side substrate 112 having the signal electrodes 114 and the reflecting film 117 formed thereon via the sealing member 115. A solution mixture of a liquid crystal and a polymeric material which causes a polymerization reaction when it is irradiated with light is sealed in a region surrounded by the substrates 111 and 112 and the sealing member 115 by a vacuum injection method.

Light (ultraviolet radiation) is evenly radiated on the solution mixture sealed region from the outer surface side of the front-side substrate 111. Upon radiation of the light, a radical polymerization reaction takes place in which the double bonds of the polymeric material in the form of a monomer or an oligomer dissociate into radicals, and radicals of adjacent molecules combine to form a polymer. This polymerization of the polymeric material causes phase-separation of the liquid crystal from the polymer resin. As a result, as shown in FIG. 5, the composite film 116 is formed, which has a structure in which the liquid crystal 116b is confined in spaces in the polymer resin 116a having a sponge-like sectional structure. Note that this method of forming a composite film is called a photopolymerization phase-separation method. Finally, a solution mixture injection opening formed in the sealing member 115 is sealed by using a sealing material, thereby completing a polymer dispersed liquid crystal display device.

Figure 6:
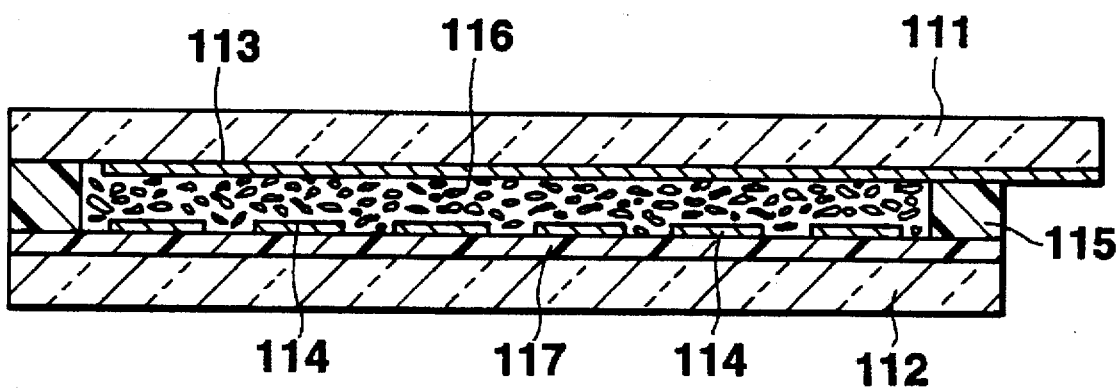
FIG. 6 is a sectional view showing a modification of the polymer dispersed liquid crystal display device according to the first embodiment.

Referring to FIG. 4, the reflecting film 117 is formed on the electrodes 114. However, for example, as shown in FIG. 6, the reflecting film 117 may be formed on the inner surface of the rear-side substrate 112, and electrodes 114, each composed of a transparent conductive film such as an ITO film, may be formed on the reflecting film 117.

In the above embodiment, a glass substrate is used as the rear-side substrate 112. However, the rear-side substrate 112 can be made of an arbitrary material regardless of whether it is transparent or translucent. As will be described in detail in the fourth embodiment, a flexible film substrate or the like may be used as the rear-side substrate 112. In addition, the reflecting film 117 is not limited to a color reflecting film consisting of a resin containing a fluorescent pigment, but may have any arrangement as long as it has a high reflectance. For example, a reflective metal film such as an aluminum film may be arranged on or under the scanning electrodes 114 via an insulating film.

As described above, in the polymer dispersed liquid crystal display device of the first embodiment, since the reflecting film is formed on the inner surface of the rear-side substrate, no attenuation of light occurs at the rear-side substrate. Therefore, a bright image can be displayed.

The present invention is not limited to a polymer dispersed liquid crystal display device, but may be applied to other light scattering liquid crystal display devices, e.g., a phase change (PC) effect liquid crystal device.

In the phase change (PC) effect liquid crystal device, a liquid crystal layer subjected to phase change is arranged between a pair of substrates, each having electrodes formed thereon with an insulating film covering the electrodes. Upon application of an electric field, this layer changes its phase between "a nematic phase having a homeotropic alignment" and "a cholesteric phase having a molecular alignment of a helical structure in which helical axes point in various directions". In general, a liquid crystal prepared by adding a cholesteric liquid crystal or a chiral nematic liquid crystal into a nematic liquid crystal is used.

In the phase change (PC) effect liquid crystal device, the liquid crystal molecules are randomly twisted/aligned in a plurality of directions while no electric field is applied. In this state, light transmitted through the liquid crystal layer is scattered. Upon application of a predetermined electric field, the liquid crystal molecules are aligned in the form of a homeotropic alignment. In this state, light is transmitted through the liquid crystal layer under almost no influence of the light scattering effect.

The liquid crystal display device is not limited to a simple matrix type, may be of an active matrix type, or of a segment display type in which segments corresponding to display patterns are formed on one substrate, and common electrodes are formed on the other substrate.

[Second Embodiment]

The second embodiment of the present invention, which relates to a more detailed arrangement of a reflecting film, will be described in more detail next with reference to the accompanying drawings.

The arrangement of a light coloring film (reflecting member) used for a liquid crystal display device according to this embodiment will be described first with reference to FIG. 7.

The light coloring film of this embodiment is composed of a fluorescent film 201 formed by adding a fluorescent material 203 into a transparent base material 202. As a material for the transparent base material 202, for example, a transparent resin such as acrylic resin, vinyl chloride resin, alkyd resin, aromatic sulfonamide resin, urea resin, melamine resin, benzoguanamine resin, or a co-condensation polymer thereof is used.

The fluorescent film 201 is formed as follows. First, a film obtained by mixing a resin material for the base material 202 and the fluorescent material 203 at a predetermined ratio is coated on a substrate (not shown) of a color liquid crystal display device by a printing or spin coat method to have a predetermined film thickness. The resin material is then hardened to form the fluorescent film 201.

The fluorescent material 203 is formed by grinding a fluorescent member into fine particles. The fluorescent member is obtained by dyeing the same resin as that used for the transparent base material 202 or another type of a transparent resin by using a fluorescent dye. The fluorescent material 203 has a wavelength conversion function of absorbing light having wavelengths other than a specific wavelength band (the wavelength band of fluorescent light emitted from the fluorescent-material 203) and emitting light with the specific wavelength band by using the energy of the absorbed light.

Therefore, light emerging from the fluorescent film 201 has the same color as that of fluorescent light emitted from the fluorescent material 203.

Coloring of light by the fluorescent film 201 will be described in more detail below. Assume that a reflecting film MA is arranged on the rear surface side of the fluorescent film 201, as indicated by the alternate long and two short dashed line in FIG. 7. In this case, light incident from the front surface side of the fluorescent film 201 is transmitted therethrough and reflected by the reflecting film MA, as indicated by solid arrows in FIG. 7. This reflected light is then transmitted through the fluorescent film 201 again to emerge therefrom. Some light components of the light transmitted through the fluorescent film 201 are incident on the fluorescent material 203.

Of the light which has been incident on the fluorescent material 203, some light components with a specific wavelength band, i.e., light components having the same wavelength band as that of fluorescent light emitted from the fluorescent material 203, are transmitted though or reflected by the fluorescent material 203. The fluorescent material 203 absorbs light components with other wavelength bands and emits light (fluorescent light) having the specific wavelength band by using the energy of the absorbed light.

Figure 7:
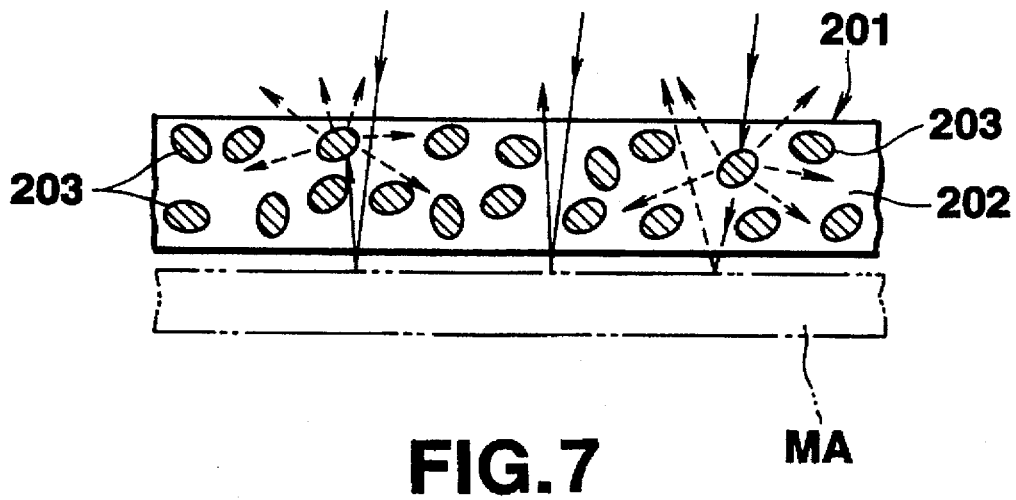
FIG. 7 is a sectional view for explaining the arrangement of a light coloring film according to the second embodiment of the present invention.

The fluorescent light emitted from the fluorescent material 203 is radiated around the fluorescent material 203, as indicated by the broken arrows in FIG. 7. Fluorescent light components propagating to the front surface of the fluorescent film 201 become reflected light from the fluorescent film 201, whereas fluorescent light components propagating to the reflecting film MA are reflected by the reflecting film MA and emerge from the front surface of the fluorescent film 201. That is, all light components transmitted through and reflected by the fluorescent material 203 emerge from the front surface of the fluorescent film 201 eventually.

Therefore, the light emerging from the fluorescent film 201 is constituted by the light components transmitted through the fluorescent film 201 without colliding against the fluorescent material 203, the fluorescent light emitted from the fluorescent material 203, and the light components transmitted through/reflected by the fluorescent material 203 (the light components having the same wavelength band as that of the fluorescent light emitted from the fluorescent material 203). The light which is transmitted through the fluorescent film 201 without colliding against the fluorescent material 203 is white light. The light emerging from the fluorescent film 201 has the same color as that of the fluorescent light emitted from the fluorescent material 203. Therefore, the light emerging from the fluorescent film 201 has the same color as that of the fluorescent light emitted from the fluorescent material 203. Note that the color density of exit light is determined by the ratio of the fluorescent material 203 in the fluorescent film 201.

A color filter used as a light coloring film in a conventional device is designed to transmit only light, of visible light, which has a specific wavelength band, and absorb light having other wavelength bands, thereby coloring exit light. In contrast to this, the fluorescent film 201 is designed to absorb visible light and ultraviolet radiation having wavelength bands other than a specific wavelength band and emit light having the specific wavelength band by using the energy of the absorbed light. Therefore, the intensity of light colored by the fluorescent film 201 is higher than that of light colored by the color filter.

Figure 9:
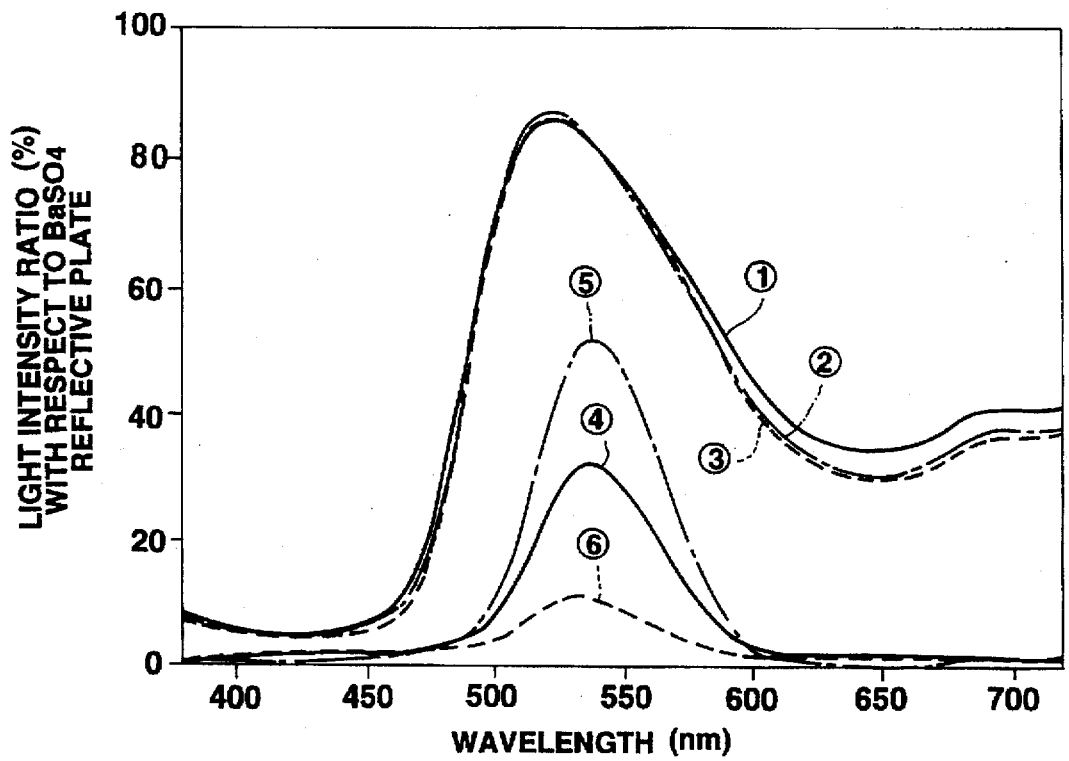
FIG. 9 is a graph showing a result obtained by measuring the intensity distributions of light beams colored by the light coloring film of the second embodiment and a color filter with reflecting films respectively arranged on the rear surface sides of the light coloring film and the color filter.

FIG. 9 shows a result obtained by measuring the intensity distributions of light beams colored by the light coloring film of the second embodiment and the color filter with reflecting films respectively arranged on the rear surface sides of the light coloring film and the color filter. More specifically, FIG. 9 shows the measurement results obtained when three kinds of reflecting films were used: an Al reflecting film having a roughened surface (to be referred to as an Al roughened surface reflecting film hereinafter), a white reflecting film consisting of BaSO$_4$ (barium sulfate) and having a light-scattering surface (to be referred to as a BaSO$_4$ reflecting film hereinafter), and a mirror surface reflecting film consisting of Ag (silver) (to be referred to as a mirror surface reflecting film hereinafter).

Note that the fluorescent film used for this measurement of the intensity distributions of colored light beams is a green fluorescent film using a fluorescent material FA-22 available from Shinroihi k.k. The fluorescent material is mixed with the base material at a weight ratio of 60/160. The color filter used is a green color filter formed by coating a material, obtained by mixing a transparent resin material and a green pigment, on a reflecting film, and subsequently hardening the transparent resin material. Both the color filter and the fluorescent film have a thickness of 7.5 μm.

As shown in FIG. 9, the intensity of light emerging from the fluorescent film 201 is much higher than that of light emerging from the color filter. In addition, the distribution of exit light with respect to the frequency hardly changes with the use of any of the following reflecting films: an Al roughened surface reflecting film, a BaSO$_4$ reflecting film, and an Ag mirror surface reflecting film.

As described above, light emerging from the fluorescent film 201 is light colored by fluorescent light emitted from the fluorescent material 203. The intensity of light colored by the fluorescent film 201 is much higher than that of light colored by the color filter.

Therefore, if a light coloring film composed of the fluorescent film 201 is used for a color liquid crystal display device, a color display with a high luminance can be performed by using light colored by this light coloring film.

Figure 8:
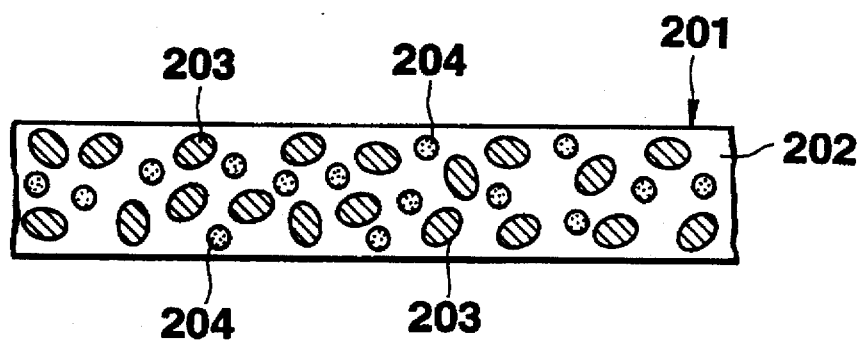
FIG. 8 is a sectional view for explaining a modification of the light coloring film of the second embodiment.

As shown in FIG. 8, a coloring pigment (a pigment used for a color filter or the like) 204 for transmitting light corresponding to the wavelength band of fluorescent light emitted from the fluorescent material 203 and absorbing light having other wavelength bands may be added into the fluorescent film 201. With this process, the color purity of light emerging from the fluorescent film 201 can be improved.

In this case, since light transmitted through the fluorescent film 201 is absorbed to a certain degree, the intensity of exit light decreases to the same degree. However, by adjusting the amount of a pigment to be added, colored light having high color purity and sufficiently high intensity can be obtained.

FIG. 10 is a sectional view showing a portion of a liquid crystal display device exemplifying the polymer dispersed liquid crystal display device using the above light coloring film. Note that this liquid crystal display device is a reflection active matrix liquid crystal display device having a reflecting film on the inner surface of the rear-side substrate.

Referring to FIG. 10, a lower substrate 211 is the rear-side substrate of the liquid crystal display device, and an upper substrate 212 is the front-side substrate.

The rear-side substrate 211 is an insulating substrate (need to be transparent) consisting of a glass plate, a resin film, or the like. A plurality of transparent pixel electrodes 213 are arranged on the rear-side substrate 211 in the row and column directions. In addition, a plurality of active elements 214 respectively corresponding to the pixel electrodes 213 are arranged on the rear-side substrate 211.

For example, each active element 214 is constituted by a TFT (thin film transistor). Each TFT 214 is constituted by a gate electrode 215 formed on the rear-side substrate 211, a gate insulating film 216 covering the gate electrode 215, a semiconductor film 217 consisting of a-Si (amorphous silicon) and formed on the gate insulating film 216 to oppose the gate electrode 215, and source and drain electrodes 218 and 219 formed on both the sides of the semiconductor film 217.

Although not shown, a gate line (address line) for supplying a gate signal to the TFT 214 and a data line for supplying a data signal corresponding to image data to the TFT 214 are arranged on the rear-side substrate 211. The gate electrode 215 of the TFT 214 is integrally formed with the gate line, and the drain electrode 219 is connected to the data line.

A reflecting film 220 is formed on the rear-side substrate 211 in correspondence with all the pixel electrodes 213 arranged on the rear-side substrate 211 to oppose almost the entire surface of each pixel electrode 213. As the reflecting film 220, any one of the above-mentioned reflecting films, i.e., the Al roughened surface reflecting film, the BaSO$_4$ reflecting film, and the Ag mirror surface reflecting film, may be used. If the reflecting film 220, the TFTs 214, the gate electrodes 215, and the gate lines are made of the same metal film (e.g., an Al film), these components can be formed at once.

Light coloring films, each composed of the above fluorescent film 201, are formed on the reflecting film 220. In this embodiment, as the light coloring films, a plurality of fluorescent films for emitting fluorescent light of different colors, e.g., a yellow fluorescent film 201a, a red fluorescent film 201b, and a green fluorescent film 201c, are used. These fluorescent films 201a, 201b, and 201c are sequentially arranged on the reflecting film 220.

A fluorescent material used for the yellow fluorescent film 201a can be obtained by using a fluorescent dye whose color index number is "C. I. 56205" or "C. I. 46040". Upon irradiation of only ultraviolet rays, the dye "C. I. 56205" emits fluorescent light whose color ranges from green to yellowish green; and the dye "C. I. 46040", fluorescent light whose color ranges from yellowish green to yellow. Under daylight, the color of fluorescent light emitted from both the dyes is yellow.

A fluorescent material used for the red fluorescent film 201b can be obtained by using a fluorescent dye whose color index number is "C. I. 45380" or "C. I. 45160". Upon irradiation of only ultraviolet rays, the color of fluorescent light emitted from both the dyes ranges from yellow to orange. Under daylight, the color of fluorescent light emitted from both the dyes is red.

Note that a pink fluorescent film may be used in place of the red fluorescent film 201b. A fluorescent material used for this pink fluorescent film can be obtained by using a fluorescent dye whose color index number is "C. I. 45170". Upon irradiation of only ultraviolet rays, the color of fluorescent light emitted from this dye ranges from orange to red. Under daylight, the color of fluorescent light emitted from the dye is pink.

The fluorescent films 201a, 201b, and 201c formed on the reflecting film 220 are covered with the gate insulating film 216 of the TFT 214. The gate insulating film 216 is a transparent film consisting of SiN (silicon nitride) or the like. The pixel electrode 213 is formed on the gate insulating film 216. One end portion of the pixel electrode 213 is connected to the source electrode 218 of the TFT 214.

The front-side substrate 212 is a transparent substrate consisting of a glass plate or a transparent resin film. A transparent counter electrode 221 is formed on almost the entire surface of the front-side substrate 212 to oppose all the pixel electrodes 213 on the rear-side substrate 211.

The rear-side substrate 211 and the front-side substrate 212 are joined to each other via a frame-like sealing member (not shown) at the peripheral portions of the substrates. A composite film 222 is formed in a region surrounded by the rear-side substrate 211, the front-side substrate 212, and the sealing member. Similar to the first embodiment, the composite film 22 has a structure in which liquid crystal domains are dispersed in a polymer resin layer. The liquid crystal used in this case is obtained by mixing a black type dichroic dye in a nematic liquid crystal having positive dielectric anisotropy.

FIGS. 11A and 11B are enlarged sectional views respectively showing the alignments of the liquid crystal molecules in one liquid crystal domain 224 of the composite film 222 in the absence and presence of an electric field. Referring to FIGS. 11A and 11B, reference symbol AM denotes a liquid crystal molecule; and BM, a dichroic dye molecule.

This liquid crystal display device is also designed to display an image by controlling scattering and transmission of light. While no electric field is applied, the liquid crystal molecules AM in each of the liquid crystal domains 224 dispersed in a polymer resin 223 of the composite film 222 point in various directions, as shown in FIG. 11A. For this reason, in the absence of an electric field, when light incident from the front surface side of the liquid crystal display device passes through the composite film 222, the light is scattered by the interfaces between the liquid crystal domains 224 and the polymer resin 223 and by the liquid crystal molecules AM. Most of the scattered light is absorbed by the dichroic dye molecules BM.

For this reason, in the absence of an electric field, only a small amount of light reaches the fluorescent films 201a, 201b, and 201c and the reflecting film 220 through the composite film 222. Therefore, the amounts of fluorescent light emitted from the fluorescent films 201a, 201b, and 201c and the amount of light emerging from the reflecting film 220 are small. In addition, these light components are scattered and absorbed when they pass through the composite film 222, so that almost no light emerges from the front surface side. Consequently, the resultant display is almost black in a dark state.

When an electric field is applied between the pixel electrodes 213 and the counter electrode 221, the liquid crystal molecules AM are uniformly aligned in a direction almost perpendicular to the major surfaces of the substrates 211 and 212, as shown in FIG. 11B. Upon alignment of the liquid crystal molecules AM, the dichroic dye molecules BM, as well, are uniformly aligned in a direction almost perpendicular to the major surfaces of the substrates 211 and 212. For this reason, in the presence of an electric field, light incident from the front surface side of the liquid crystal display device is transmitted through the composite film 222 under almost no influences of the light scattering effect of the composite film 222 and absorption by the dichroic dye.

In the presence of an electric field, therefore, incident light reaches the fluorescent films 201a, 201b, and 201c and the reflecting film 220 through the composite film 222. This light causes the fluorescent films 201a, 201a, 201b, and 201c to emit fluorescent light. In addition, the light is reflected by the reflecting film 220 to emerge from the front surface of the liquid crystal display device upon passing through the composite film 222 again.

In this case, the display colors correspond to the colors of fluorescent light emitted from the fluorescent films 201a, 201b, and 201c. In this liquid crystal display device, since the yellow, red, and green fluorescent films 201a, 201b, and 201c are sequentially arranged in correspondence with each pixel electrode 213, a color image obtained by a combination of the three colors, yellow, red, and green is displayed.

As described above, the intensity of each of light beams colored by the fluorescent films 201a, 201b, and 201c is much higher than that of light colored by a color filter. Therefore, the liquid crystal display device of this embodiment can display a color image with a high luminance.

In addition, since the reflecting film 220 is arranged on the inner surface of the rear-side substrate 211, the distance from the front surface (in contact with the front-side substrate 212) of the composite film 222 to the reflecting film 220 is short. For this reason, the deviation between an actually seen region and a bright region on the reflecting film 220 is small when the liquid crystal display device is obliquely seen. Therefore, a bright display can be obtained when obliquely observed, and blurring of a peripheral portion of each pixel can be prevented.

Figure 12:
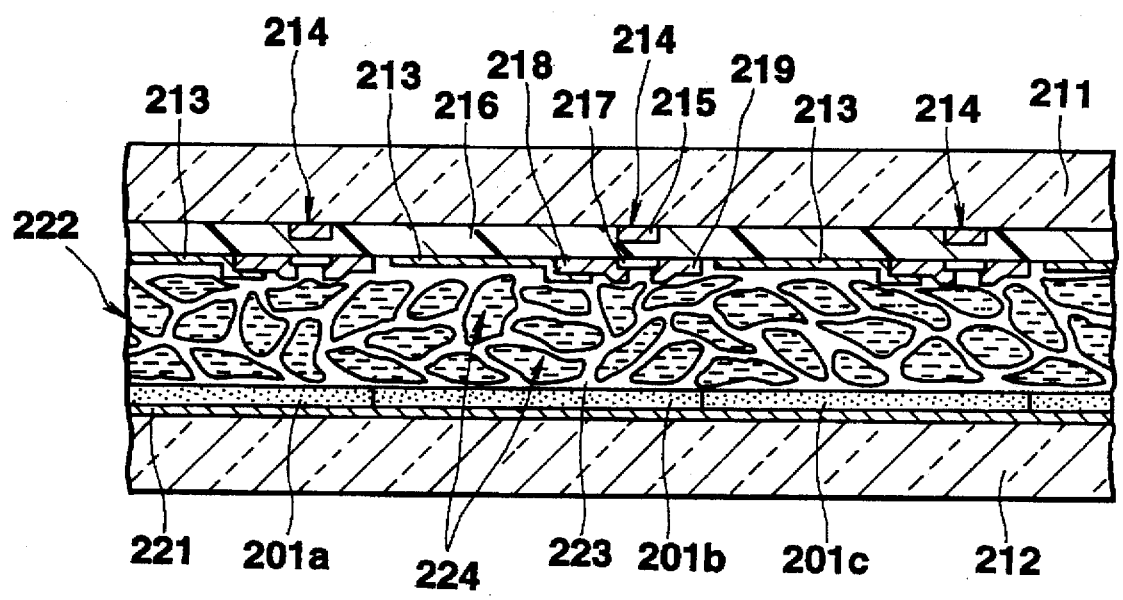
FIG. 12 is a sectional view showing a modification of the polymer dispersed liquid crystal display device in FIG. 10.

In the arrangement shown in FIG. 10, the light coloring films (fluorescent films 201a, 201b, and 201c) are formed on the substrate 211 on which the pixel electrodes 213 and the TFT 214 are formed. As shown in FIG. 12, however, the light coloring films may be formed on the substrate 212 having the counter electrode 221 formed thereon.

In the arrangement shown in FIG. 12, the substrate 211 serves as the front-side substrate and is formed as a transparent substrate.

The rear-side substrate 212 need not be transparent. The counter electrode 221 is formed on the rear-side substrate 212. This counter electrode also serves as a reflecting film. More specifically, this film is a conductive reflecting film composed of the above Al roughened surface reflecting film or Ag mirror surface reflecting film.

The yellow, red, and green fluorescent films 201a, 201b, and 201c are sequentially formed on the counter electrode 221 to oppose the pixel electrode 213.

In this arrangement, a color image with a high luminance can also be displayed by reflecting and coloring incident light. Since the counter electrode 221 is used as a reflecting film, the structure of the display device is simplified, and the manufacturing cost is reduced.

Similar to the first embodiment, each of the fluorescents having the arrangements shown in FIGS. 10 and 12 is formed by the method of joining the substrates 211 and 212 to each other via a sealing member, injecting/filling a solution mixture of a polymeric material, which causes a polymerization reaction when it is irradiated with light, and a liquid crystal having a dichroic dye added thereinto between the substrates 211 and 212, and photopolymerizing the polymeric material by radiating ultraviolet rays from the front surface side of the front-side substrate which is the transparent substrate.

[Third Embodiment]

Figure 13:
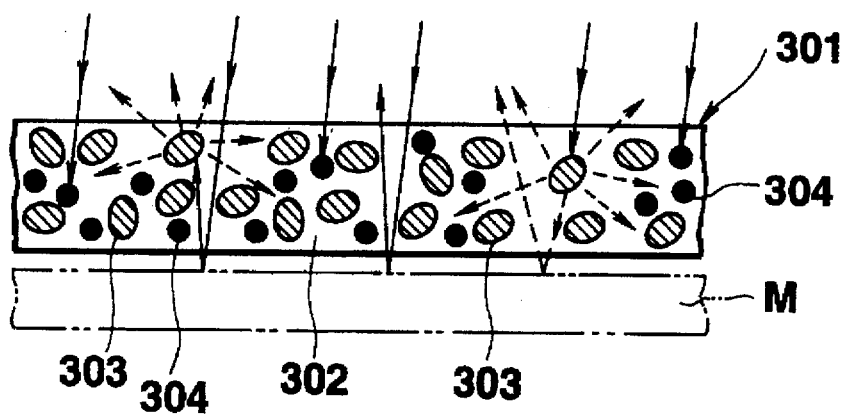
FIGS. 13 and 14 are sectional views for explaining the arrangement of a light coloring film of the third embodiment of the present invention.

In the second embodiment, a fluorescent film is formed by adding a fluorescent material into a transparent base material. As shown in FIG. 13, however, a fluorescent film 301 may be formed by adding a fluorescent material 303 and a phosphorescent material 304 into a transparent base material 302.

For example, the fluorescent film 301 shown in FIG. 13 is formed as follows. First, a film obtained by mixing a resin material as the transparent base material 302, the fluorescent material 303, and the phosphorescent material 304 at a desired ratio is formed on a substrate (not shown) by a printing method, a spin coat method, or the like to have a predetermined thickness. The resin material is then hardened to form the fluorescent film 301.

The transparent base material 302, the fluorescent material 303, and the like are the same as those used in the second embodiment.

The phosphorescent material 304 is a zinc sulfate powder, a calcium sulfate powder, or the like used for a luminous paint. The phosphorescent material 304 absorbs externally radiated light, accumulates the excited energy, and gradually converts the accumulated energy into light, thereby emitting the light.

As illustrated in FIG. 13, some light components of light incident on the fluorescent film 301 are radiated on the fluorescent material 303. Of the radiated light components, light components having the same wavelength band as that of fluorescent light emitted from the fluorescent material 303 are transmitted through or reflected by the fluorescent material 303, and light components having other wavelength bands are absorbed by the fluorescent material 303. The fluorescent material 303 emits light (fluorescent light) having the specific wavelength band by using the energy of the absorbed light components. For this reason, light emerging from the fluorescent film 301 has the same color as that of fluorescent light emitted from the fluorescent material 303. The color density of the exit light is determined by the ratio of the fluorescent material 303 in the fluorescent film 301.

In addition, since this light coloring film is formed by adding the phosphorescent material 304 into the fluorescent film 301, even after light ceases to be incident on the liquid crystal display device, light is emitted from the phosphorescent material 304 into the fluorescent film 301, thereby causing the liquid crystal display device to perform a color display using fluorescent light emitted from the fluorescent film 301.

More specifically, as shown in FIG. 13, some light components of light incident from the front surface side of the fluorescent film 301 and of light reflected by the reflecting film MA are absorbed by the phosphorescent material 304 as they pass through the fluorescent film 301, and the energy of the light components is accumulated in the phosphorescent material 304. The phosphorescent material 304 converts the accumulated energy into light and emits it. However, while a sufficient amount of external light is incident on the fluorescent film 301, since the amount of light absorbed by the phosphorescent material 304 is larger than the amount of emitted light, the phosphorescent material 304 accumulates optical energy until it reaches a saturated state. In this case, light emitted from the phosphorescent material 304 is hardly seen because the fluorescent film 301 receives a sufficient amount of external light and emits colored light with a high intensity.

Figure 14:
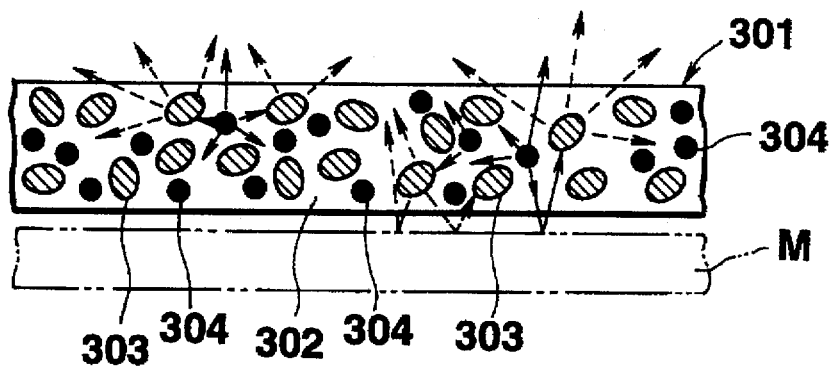

When it becomes dark around the display device, and almost no light is incident on the fluorescent film 301, the phosphorescent material 304 keeps emitting light until no accumulated energy is left, as illustrated in FIG. 14. All or part of the light emitted from the phosphorescent material 304 are incident on the fluorescent material 303 in the fluorescent film 301. The fluorescent material 303 transmits or reflects light components, of the radiated light, which have a specific wavelength band, and absorbs light components having other wavelength bands, thereby emitting light (fluorescent light) with the specific wavelength band by using the energy of the absorbed light components. For this reason, the light emerging from the fluorescent film 301 has a color obtained by mixing the color of the fluorescent light emitted from the fluorescent material 303 with the color of light emitted from the phosphorescent material 304.

The intensity of light emerging from the fluorescent film 301 is considerably lower than that of exit light obtained when a sufficient amount of external light is incident on the fluorescent film 301. However, by selecting a proper amount of the phosphorescent material 304 mixed in the fluorescent film 301, colored light which is bright enough to recognize a display on the liquid crystal display device can be obtained.

That is, with the formation of the fluorescent film 301 on the rear-side substrate of the liquid crystal display device, even after light ceases to be incident on the liquid crystal display device, the device is capable of a color display using colored fluorescent light emitted from the fluorescent film 301.

Figure 15:
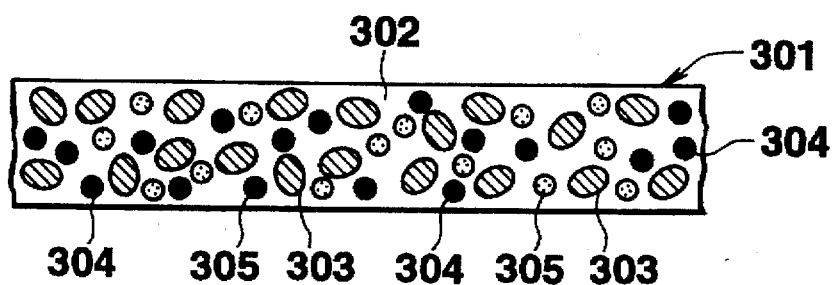
FIG. 15 is a sectional view for explaining the arrangement of a modification of the light coloring film of the third embodiment.

As shown in FIG. 15, in addition to the phosphorescent material 304, a coloring pigment 305 for transmitting light having the same wavelength band as that of fluorescent light emitted from the fluorescent material 303 and absorbing light having other wavelength bands may be added into the fluorescent film 301. In this case, since light transmitted through the fluorescent film 301 is absorbed by the coloring pigment 305 to a certain degree, the intensity of exit light decreases to the same degree. However, by adjusting the amount of the coloring pigment 305 to be added, colored light having high color purity and sufficiently high intensity can be obtained.

The light coloring film of this embodiment can be used as each of the light coloring films 201a, 201b, and 201c of the liquid crystal display devices shown in FIGS. 10 and 12 without any modification.

In the second and third embodiments, the light coloring film of the present invention is applied to the reflection type polymer dispersed liquid crystal display devices. However, the light coloring film of the present invention can be applied, as a transmission coloring film, to transmission type liquid crystal display devices.

In addition, the light coloring film of the present invention is not limited to a polymer dispersed liquid crystal display device but may be widely applied to various types of liquid crystal display devices, e.g., TN and STN type liquid crystal display devices and liquid crystal display devices using ferroelectric and anti-ferroelectric liquid crystals. In addition, these liquid crystal display devices may be of an active matrix type, a simple matrix type, a segment display type, or the like.

[Fourth Embodiment]

The fourth embodiment of the present invention in which the brightness of a light scattering liquid crystal display device and the clearness of a display image are improved will be described next with reference FIGS. 16 to 19.

Figure 16:
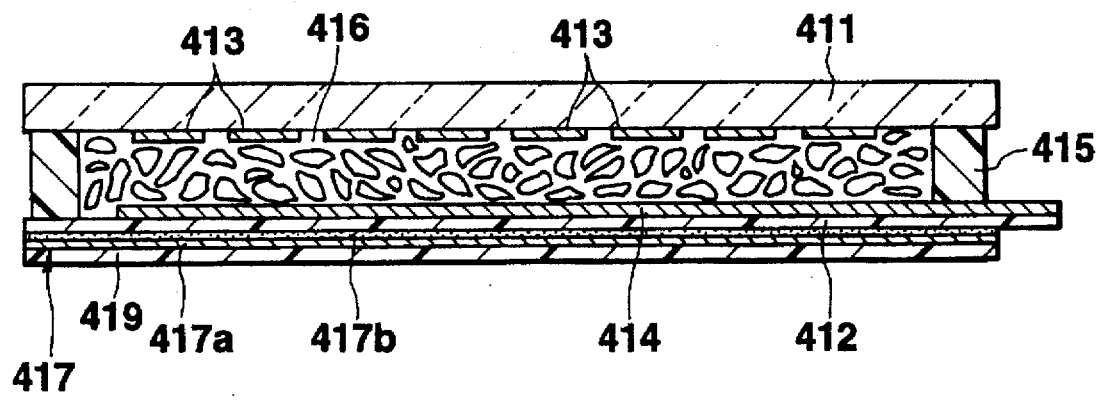
FIG. 16 is a sectional view for explaining the arrangement of a polymer dispersed liquid crystal display device according to the fourth embodiment of the present invention.

As shown in FIG. 16, in this polymer dispersed liquid crystal display device, a pair of front- and rear-side substrates 411 and 412 are joined to each other via a frame-like sealing member 415 disposed at the peripheral portions of the substrates, and a composite film 416 composed of a polymer resin and a liquid crystal is arranged in a region surrounded by the sealing member between the substrates 411 and 412. Transparent electrodes 413 and 414 are respectively formed on the inner surfaces (opposing the composite film 416) of the substrates 411 and 412.

For example, this polymer dispersed liquid crystal display device is of a simple matrix type. The electrodes on one substrate, e.g., the electrodes 414 on the rear-side substrate 412, are a plurality of scanning electrodes formed to be parallel to each other, and the electrodes on the other substrate, i.e., the electrodes 413 on the front-side substrate 411, are a plurality of signal electrodes formed to be perpendicular to the scanning electrodes 414.

The arrangement of the composite film 416 is substantially the same as that shown in FIG. 5. That is, the composite film 416 is composed of a polymer resin layer and liquid crystal domains dispersed therein. Similar to the second embodiment, the liquid crystal may contain a dichroic dye.

The front-side substrate 411 is a hard substrate consisting of glass or the like. The rear-side substrate 412 is a flexible substrate consisting of a transparent resin film such as PET (polyethylene terephthalate).

Note that the front-side substrate (hard substrate) 411 has a thickness (about 0.3 mm in the case of a liquid crystal display device with a small screen and about 2 mm in the case of a liquid crystal display device with a large screen) which can ensure strength against a bending force, a twisting force, and the like applied to the liquid crystal display device. The rear-side substrate (flexible substrate) 412 has a thickness of about 0.1 mm.

In addition, this polymer dispersed liquid crystal display device is of a reflection type having a reflecting member 417 on the outer surface of the rear-side substrate (flexible substrate) 412. The reflecting member 417 is constituted by a reflecting film 417a and a fluorescent film 417b. The reflecting film 417a is made of a metal film, e.g., an aluminum film, or a white reflecting film consisting of $BaSO_4$ (barium sulfate). The fluorescent film 417b is formed on the upper surface of the reflecting film 417a. Note that the reflecting film 417a is deposited on the surface of a base sheet 419 consisting of a resin film or the like by a vapor deposition or sputtering method.

The fluorescent film 417b is formed by dispersing a fine fluorescent pigment powder in a transparent resin. The fluorescent film 417b serves to convert light reflected by the reflecting film 417a into colored light having a high luminance. The fluorescent film 417b may contain a phosphorescent material.

In this embodiment, in order to display a color image, the fluorescent film 417b is designed such that a region for emitting red fluorescent light (a region into which a fluorescent pigment for emitting red fluorescent light is mixed), a region for emitting green fluorescent light (a region into which a fluorescent pigment for emitting green fluorescent light is mixed), and a region for emitting blue fluorescent light (a region into which a fluorescent pigment for emitting blue fluorescent light is mixed) are alternately formed in correspondence with each pixel portion of the liquid crystal display device.

In this embodiment, the rear-side substrate 412 is composed of a resin film and is very thin (about 0.1 mm). For this reason, the distance from the surface of the composite film 416 (which is in contact with the front-side substrate 411) to the surface of the reflecting member 417 is short. Therefore, only a small portion of a display is omitted when the display is obliquely seen.

Figure 17:
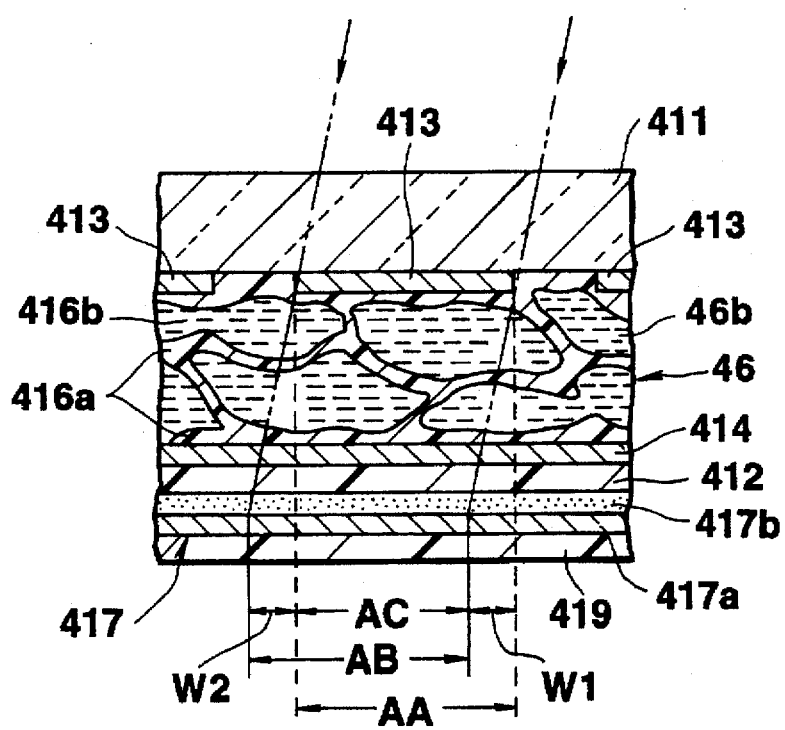
FIG. 17 is a sectional view for explaining a case wherein a display is obliquely observed in the polymer dispersed liquid crystal display device of the fourth embodiment.

That is, in this liquid crystal display device, as shown in FIG. 17, when a display is obliquely seen, a seen region AB deviates from a bright region AA on the reflecting member 417. For this reason, only a region AC can be seen with a region W1 omitted. That is, some pixels are apparently omitted. Although a region W2 can be seen, this portion is dark because of scattering of light at the composite film 416. Therefore, of the bright region AA, only the region AC is seen as ON pixels. That is, the pixels are apparently reduced.

In the polymer dispersed liquid crystal display device of this embodiment, since the distance from the surface of the composite film 416 to the surface of the reflecting member 417 is short, the deviation between the bright region AA and the region AB on the reflecting member 417 is small when the display is obliquely seen. That is, the width of an omitted portion of the display is small.

For this reason, according to the polymer dispersed liquid crystal display device of this embodiment, even if the screen is obliquely seen, a display quality similar to that obtained when the screen is squarely seen can be obtained. That is, the display device of the embodiment ensures a brighter, clearer display image than the conventional liquid crystal display device.

Furthermore, in this polymer dispersed liquid crystal display device, since the reflecting member 417 is constituted by the reflecting film 417a and the fluorescent film 417b formed thereon, a bright color image can be displayed, as described in the second and third embodiments. Especially in this embodiment, since a region for emitting red fluorescent light, a region for emitting green fluorescent light, and a region for emitting blue fluorescent light are alternately formed in correspondence with each pixel portion of the liquid crystal display device, a multicolor display can be performed by coloring each pixel in red, green, or blue.

A method of manufacturing a polymer dispersed liquid crystal display device having the structure shown in FIG. 16 will be described next with reference to FIG. 18.

To begin with, a solution mixture 416' of a liquid crystal and a polymeric material which causes a polymerization reaction when irradiated with light is coated on the front-side substrate 411, which is a hard substrate, by screen printing or gravure printing to have a predetermined thickness. The sealing member 415 is coated in the form of a frame along the peripheral portion of the rear-side substrate 412, which is a flexible substrate, by screen printing or the like. As a material for the sealing member 415, for example, a polymeric material which causes a polymerization reaction when irradiated with light is used.

Figure 18:
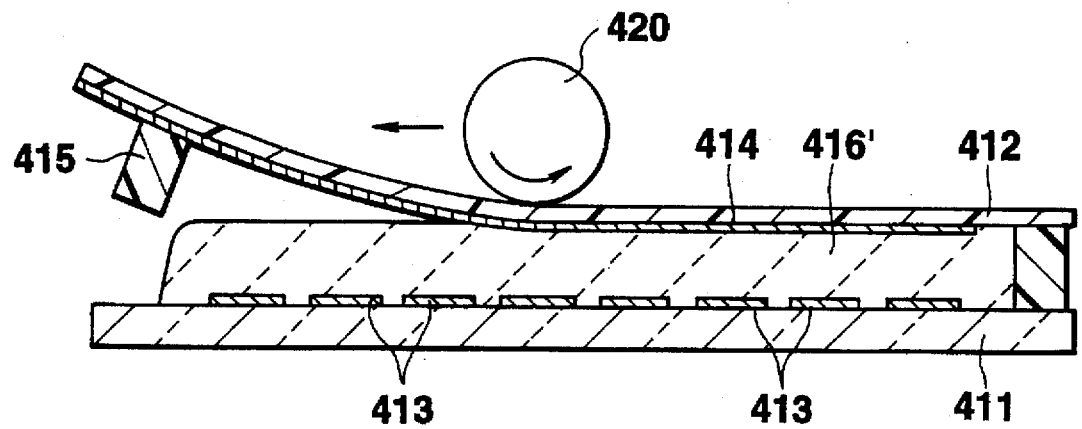
FIG. 18 is a sectional view for explaining a method of manufacturing the polymer dispersed liquid crystal display device of the fourth embodiment.

Subsequently, as shown in FIG. 18, the rear-side substrate 412 is bent in the form of an arc, and one end side of the rear-side substrate 412 is stacked on one end of the front-side substrate 411 via the sealing member 415. The rear-side substrate 412 is pressed against the front-side substrate 411 with a constant pressure by a pressure roller 420. In this state, the pressure roller 420 is rolled from one end side to the other end side of the front-side substrate 411, thereby stacking the rear-side substrate 412 on the front-side substrate 411 from one end side of the rear-side substrate 412.

As the substrates 411 and 412 are stacked on each other, the sealing member 415 and the solution mixture 416' are pressed, from one end side of each of the substrates 411 and 412, to have a predetermined thickness. At the same time, the air between the substrates 411 and 412, especially the air in the irregular surface of the solution mixture 416', is sequentially pushed out from one end side to the other end side. For this reason, no air is confined between the substrates 411 and 412.

Light (ultraviolet ray) is then radiated from the outer surface side or sides of one or both of the substrates 411 and 412 to harden the sealing member 415 and photopolymerize the polymeric material of the solution mixture 416', thus forming the composite film 416 composed of the liquid crystal and the polymer resin. Thereafter, the reflecting member is bonded to the outer surface of the rear-side substrate 412 to complete a liquid crystal display device.

As described above, according to the liquid crystal display device of the above embodiment, no air is confined between the substrates 411 and 412 even if the liquid crystal display device is manufactured by the method of manufacturing a display device by joining substrates 411 and 412 after the solution mixture 416' of the polymer material and the liquid crystal is supplied onto one substrate, which method can manufacture a display device at a low cost. No air bubbles are formed in the composite film 416 and between the composite film 416 and the substrates 411 and 412, thus preventing display irregularity due to nonuniform optical characteristics of the liquid crystal display device.

In the above description, the solution mixture 416' is coated on the front-side substrate 411 which is the hard substrate, and the sealing member 415 is coated on the rear-side substrate 412 which is the flexible substrate. However, the solution mixture 416' and the sealing member 415 may be coated on the opposite substrates to those described above. In the above manufacturing method, after the substrates 411 and 412 are stacked on each other, the polymeric material of the solution mixture is photopolymerized to form the composite film 416. However, the composite film 416 may be formed by photopolymerization before the substrates 411 and 412 are stacked on each other.

In the liquid crystal display device of this embodiment, the rear-side substrate 412 is a flexible substrate made of a resin film. However, the strength of the liquid crystal display device can be ensured because the front-side substrate 411 is formed as a hard substrate having sufficient strength.

In the above embodiment, the rear-side substrate 412 has a thickness of about 0.1 mm. However, the thickness of the rear-side substrate 412 is 0.05 to 0.25 mm, preferably 0.07 to 0.13 mm. If the thickness of the rear-side substrate 412 falls within this range, a width W1 of an omitted portion of a display can be sufficiently reduced. In addition, the tensile strength of the rear-side substrate 412 can be ensured.

Figure 19:
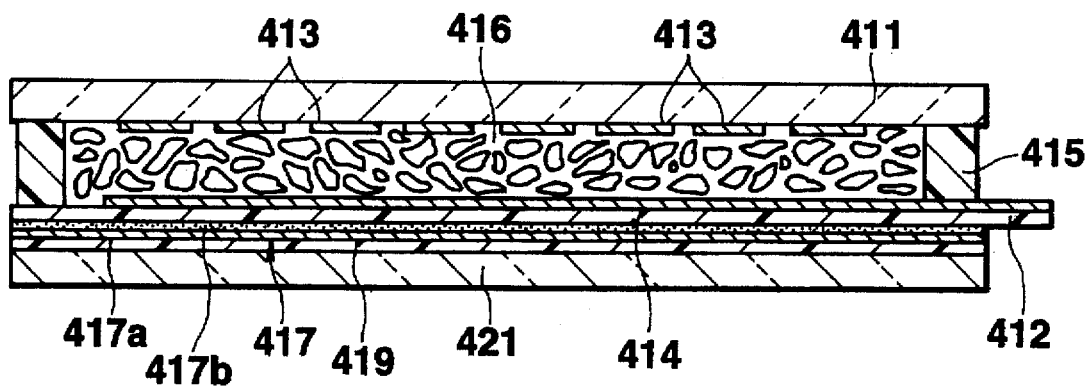
FIG. 19 is a sectional view showing a modification of the polymer dispersed liquid crystal display device of the fourth embodiment.

In the above embodiment, the strength of the liquid crystal display device is ensured by the front-side substrate 411. However, for example, as shown in FIG. 19, a hard protective plate 421 consisting of glass, a hard resin, a metal plate, or the like may be formed on the rear surface of a base sheet 419 of the reflecting member 417 formed on the outer surface of the rear-side substrate 412, thereby reinforcing the rear surface side of the liquid crystal display device by means of the protective plate 421.

In this case, the base sheet 419 may be omitted, and the reflecting film 417a may be directly formed or arranged on the surface of the protective plate 421. If the hard protective plate 421 is arranged on the rear surface side of the liquid crystal display device in this manner, the front-side substrate 411 may also be a flexible substrate consisting of a resin film or the like because the strength of the liquid crystal display device can be ensured by the protective plate 421.

In the above description, the reflecting member is constituted by the reflecting film 417a and the fluorescent film 417b. If, however, a high reflectance can be ensured by using the reflecting film 417a alone, the fluorescent film 417b need not be used.

In general, a liquid crystal display device is manufactured by the following two methods: (1) a method of joining a pair of substrates to each other via a sealing member, and subsequently filling a liquid crystal between the substrates by a vacuum injection method, and (2) a method of supplying a proper amount of a liquid crystal onto one of substrates, and subsequently joining the substrates to each other. In the manufacturing method (1), since a large scale vacuum injection apparatus is required, the cost of manufacturing equipment is high. In addition, it takes much time to inject a liquid crystal.

In the manufacturing method (2), a liquid crystal display device can be easily formed by printing or dropping a proper amount of a liquid crystal on one of substrates. That is, a liquid crystal display device can be easily manufactured at a low cost.

In the manufacturing method (2), however, when one substrate having a liquid crystal coated thereon is joined to the other substrate having a sealing member printed thereon, air is confined between the substrates, and this air is left as air bubbles in the liquid crystal layer or between the liquid crystal layer and the substrates. As a result, the electrical characteristics of the liquid crystal display device are made nonuniform, and display irregularity occurs.

According to this embodiment, since the rear-side substrate 412 is a flexible substrate consisting of a resin film or the like, when the two substrates 411 and 412 are to be joined to each other, the rear-side substrate 412 can be bent in the form of an arc and sequentially stacked on the front-side substrate 411 from one end side. As the substrates 411 and 412 are stacked on each other in this manner, the air between the substrates 411 and 412 is sequentially pushed from one end side to the other end side. With this process, no air is confined between the substrates 411 and 412. Therefore, a high-quality liquid crystal display device free from the problem of air bubbles and the like and display irregularity can be manufactured by an easy process.

[Fifth Embodiment]

The fifth embodiment of the present invention in which the brightness of a liquid crystal display device having a light-shielding film (black mask) and the clearness of a display image are improved will be described with reference to the accompanying drawings.

Figure 20:
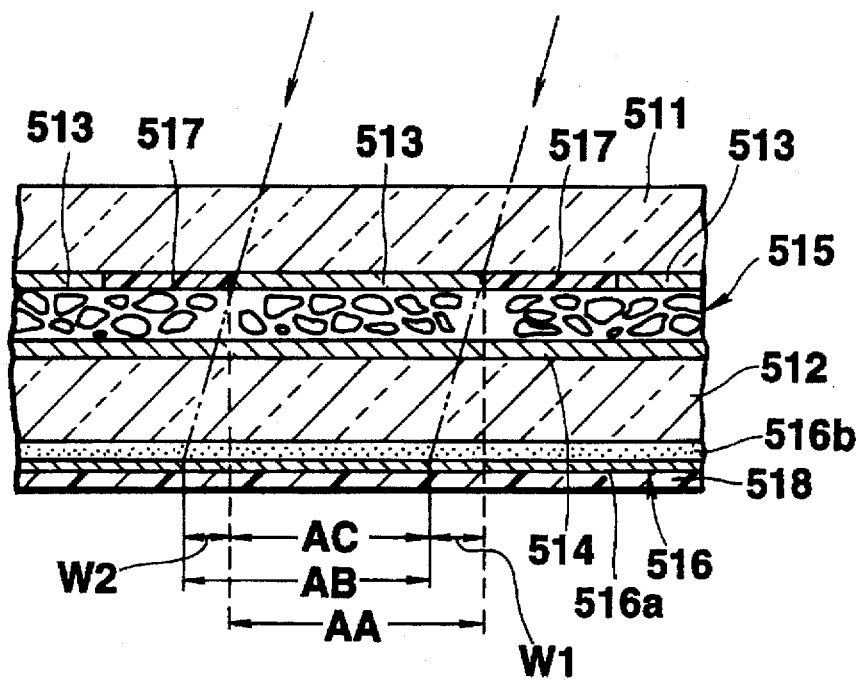
FIG. 20 is a sectional view showing the main part of a polymer dispersed liquid crystal display device according to the fifth embodiment of the present invention.

FIG. 20 is a sectional view showing a portion of a polymer dispersed liquid crystal display device according to this embodiment.

The polymer dispersed liquid crystal display device of this embodiment is of a simple matrix type, in which a pair of front- and rear-side transparent substrates 511 and 512, each consisting of glass or the like, are joined to each other via a frame-like sealing member (not shown) at the peripheral portions of the substrates, and a composite film 515 composed of a liquid crystal and a polymer resin is arranged in a region surrounded by the sealing member between the substrates 511 and 512. Transparent electrodes 513 and 514 are respectively formed on the inner surfaces (opposing the composite film 515) of the substrates 511 and 512.

For example, the transparent electrodes 513 are a plurality of signal electrodes formed to be parallel to each other, and the transparent electrodes 514 are a plurality of scanning electrodes formed to be perpendicular to the signal electrodes 513. In addition, the composite film 515 composed of the liquid crystal and the polymer resin has the same structure as that of the composite film 116 shown in FIG. 5.

In this polymer dispersed liquid crystal display device, a base sheet 518 consisting of a resin film or the like and a reflecting member 516 formed on the upper surface thereof are arranged on the lower surface of the rear-side substrate 512. This reflecting member 516 is constituted by a metal film 516a consisting of an Al film deposited on the upper surface of the base sheet 518 by a vapor deposition method or a sputtering method, and a fluorescent film 516b formed on the upper surface of the metal film 516a.

Similar to the second and third embodiments, the fluorescent film 516b is formed by dispersing a fluorescent pigment (and a phosphorescent material as needed) in a transparent resin. This fluorescent film 516b serves to convert light reflected by the reflecting member 516 into colored light having a luminance. The principle of coloring of light by means of the fluorescent film 516b is the same as that described in the second and third embodiments.

In order to display a color image, the fluorescent film 516b is designed such that a region for emitting red fluorescent light (a region into which a fluorescent pigment for emitting red fluorescent light is mixed), a region for emitting green fluorescent light (a region into which a fluorescent pigment for emitting green fluorescent light is mixed), and a region for emitting blue fluorescent light (a region into which a fluorescent pigment for emitting blue fluorescent light is mixed) are sequentially formed in correspondence with each pixel portion of the liquid crystal display device.

A light-shielding film 517 is formed on the inner surface of the front-side substrate 511 in correspondence with a non-display region, i.e., a region other than a pixel portion where the scanning and signal electrodes 514 and 513 intersect and oppose each other.

The light-shielding film 517 is composed of a black translucent insulating film (e.g., a resin film containing a black pigment) and is formed into, for example, a lattice-like pattern having openings in portions corresponding to the respective pixels. Of the light-shielding film 517, portions corresponding to the spaces between the signal electrodes 513 are formed on the inner surface of the front-side substrate 511 to leave no spaces with respect to the signal electrodes 513, and portions corresponding to the spaces between the scanning electrodes 514 are stacked on the upper or lower surfaces of the signal electrodes 513.

In the polymer dispersed liquid crystal display device of this embodiment, since the light-shielding film 517 corresponding to the non-display region is formed on the inner surface of the front-side substrate 511, the distance from the light-shielding film 517 to the reflecting member 516 is shorter than that in the conventional liquid crystal display device by the thickness of the front-side substrate 511. Therefore, a bright, clear display image can be obtained.

The liquid crystal display device of this embodiment will be described in detail with reference to FIG. 20. In this liquid crystal display device, when a display is seen in the oblique direction indicated by arrows (the direction inclined with respect to the normal to the liquid crystal display device), a visual field region AB deviates from a bright region (a region where transmitted light is reflected) on the reflecting member 516. For this reason, one side portion of the bright region AA is obstructed by the light-shielding film 517 and hence cannot be seen by a width W1. As a result, only a region AC of the bright region AA is seen, and a one side portion of an ON pixel is omitted.

The width W1 of the omitted portion of each ON pixel increases with increases in the visual angle (the angle with respect to the normal to the liquid crystal display device) increases and the distance from the light-shielding film 517 to the reflecting member 516 increases.

In the liquid crystal display device of this embodiment, since the light-shielding film 517 is formed on the inner surface of the front-side substrate 511, the distance from the light-shielding film 517 to the reflecting member 516 formed on the outer surface of the rear-side substrate 512 is shorter than the distance from the light shielding film to the reflecting member in the conventional liquid crystal display device by the thickness of the front-side substrate 511.

For this reason, in this liquid crystal display device, when a display is obliquely seen, the deviation between the bright region AA and the visual field region AB on the reflecting member 516 is small as compared with the conventional device, and hence the width W1 of the omitted portion is smaller than that in the conventional device. Therefore, the width of each ON pixel seen through a corresponding opening of the light-shielding film 517 when the screen is obliquely seen, becomes larger than that in the conventional device.

Figure 1:
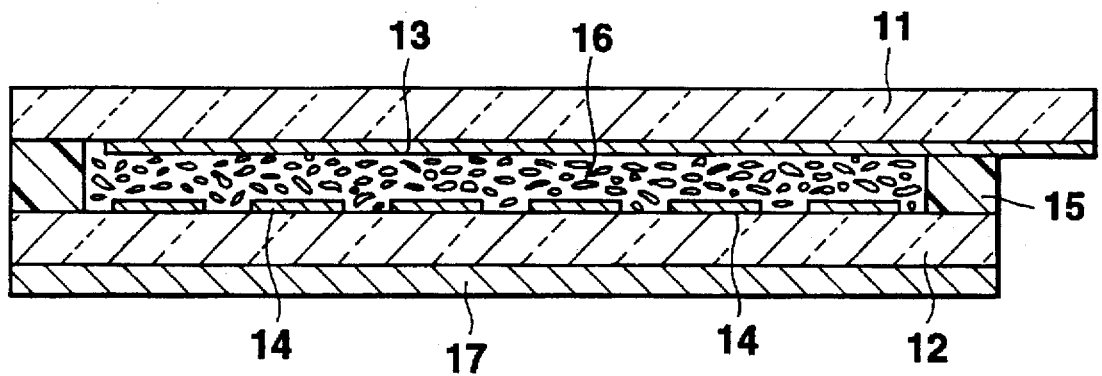
FIG. 1 is a sectional view showing a conventional polymer dispersed liquid crystal display device.
Figure 2:
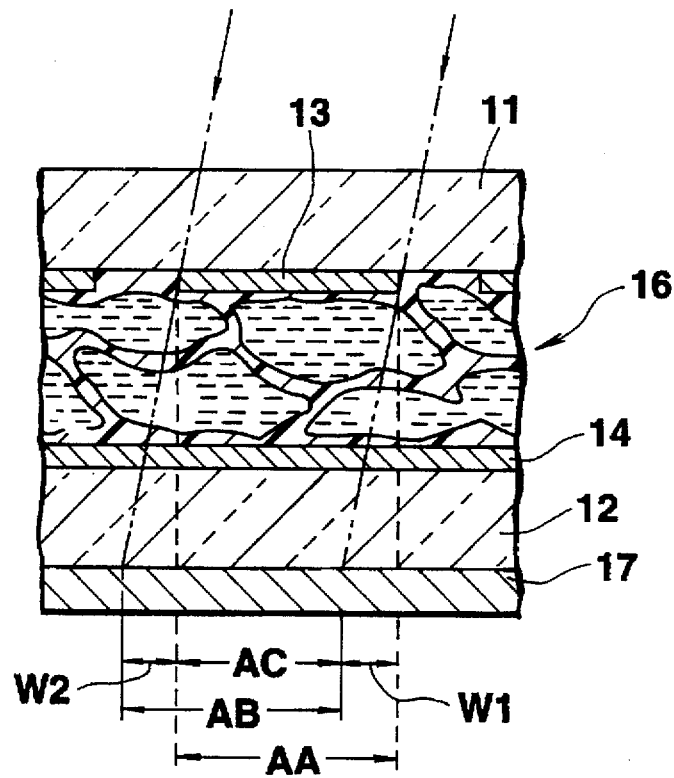
FIGS. 2 and 3 are sectional views for explaining the drawbacks of the conventional polymer dispersed liquid crystal display device.
Figure 3:
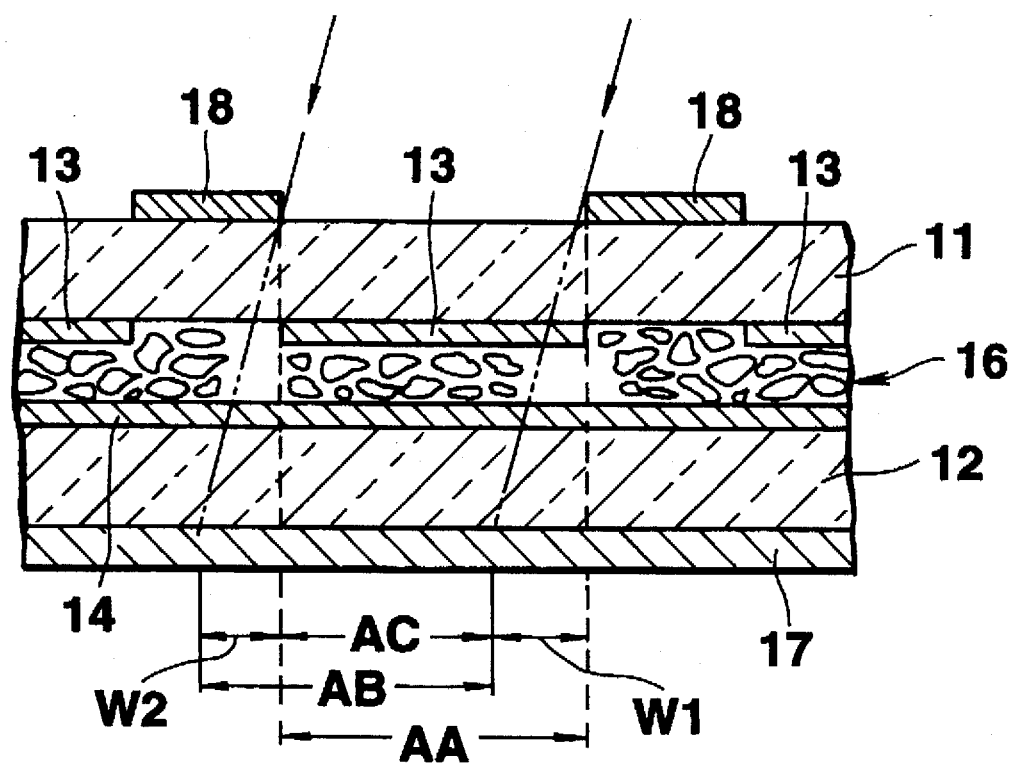

[Table 1] shows the ratios of the effective widths of pixels, visually recognized when obliquely seen, to the widths of the pixels squarely seen in the liquid crystal display device of this embodiment and in the conventional liquid crystal display device shown in FIG. 3. Note that in both the device of the embodiment and the conventional device in [Table 1], each of the front- and rear-side substrates has a thickness of 1.1 mm, and the composite film composed of the liquid crystal and the polymer resin has a thickness of 20 μm. In addition, the width of each pixel obliquely seen is the width of a pixel seen from a direction inclined with respect to the normal to the liquid crystal display device by 10°.

TABLE 1

| Width (mm) | Ratio (%) of Width of Pixel Obliquely Seen to Width of Pixel Squarely Seen | |
|---|---|---|
| of Pixel Squarely Seen | Conventional Device | Device of First Embodiment |
| 10 | 96.1 | 98.0 |
| 5 | 92.2 | 96.1 |
| 1 | 60.9 | 80.3 |
| 0.5 | 21.7 | 60.5 |

As shown in [Table 1], the ratio of the effective width of a pixel visually recognized when obliquely seen to the width of the pixel squarely seen in the liquid crystal display device of the above embodiment is higher than that in the conventional liquid crystal display device. This phenomenon becomes more noticeable as the width of a pixel squarely seen decreases.

According to the above liquid crystal display device, therefore, a display with a quality similar to a display quality obtained when the display is squarely seen can be obtained. That is, this liquid crystal display device can obtain a display image much brighter and clearer than that obtained by the conventional liquid crystal display device.

In the liquid crystal display device of this embodiment, when a display is obliquely seen, a portion of a region (a region located in the direction in which the visual field region AB deviates) adjacent to the bright region AA on the reflecting member 516 is seen by a width W2 in a corresponding opening of the light-shielding film 517 together with an ON pixel.

This adjacent region is a non-display region in which an electric field is always absent. Although light incident on a non-display region is shielded by the light-shielding film 517, this region has a certain degree of brightness because of scattered light entering from an adjacent display region. Consequently, a dim shadow is seen on the region having the width W2 which is adjacent to the ON pixel.

In the liquid crystal display device of this embodiment, however, since the deviation between the bright region AA and the visual field region AB is small, the width W2 of a dim shadow is small. Therefore, blurring of a display due to this shadow can be reduced.

In addition, in this liquid crystal display device, since the reflecting member 516 has the fluorescent film 516b, a bright color image can be displayed, as described in the second and third embodiments.

[Sixth Embodiment]

Figure 21:
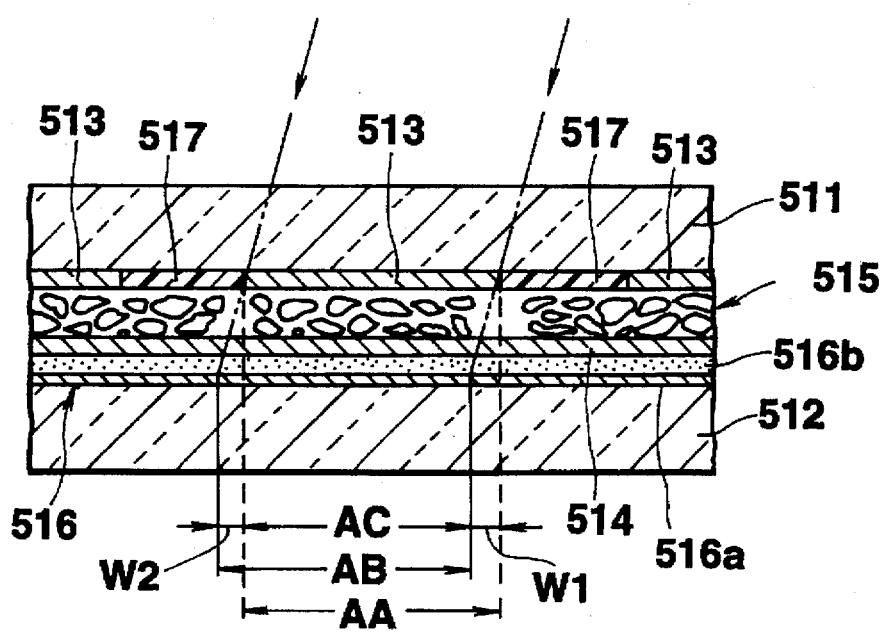
FIG. 21 is a sectional view showing the main part of a polymer dispersed liquid crystal display device according to the sixth embodiment of the present invention.

In the arrangement shown in FIG. 20, the reflecting member 516 is arranged on the outer surface of the rear-side substrate 512. However, as shown in FIG. 21, a reflecting member 516 may be arranged on the inner surface of a rear-side substrate 512, and transparent electrodes 514 may formed on the reflecting member 516.

The reflecting member 516 is designed such that a fluorescent film 516b is formed on a reflecting film 516a. Since the fluorescent film 516b has insulating properties, even if the electrodes 514 are directly formed on the reflecting member 516, the electrodes 514 are not short-circuited to each other.

Other arrangements of the liquid crystal display device of this embodiment are the same as those of the liquid crystal display device of the fourth embodiment. In this embodiment, however, the rear-side substrate 512 may be a transparent substrate.

In the liquid crystal display device of this embodiment, since the reflecting member 516 is formed on the inner surface of the rear-side substrate 512 as well as a light-shielding film 517 on the inner surface of a front-side substrate 511, the distance from the light-shielding film 517 to the reflecting member 516 is shorter than that in the fourth embodiment by the thickness of the rear-side substrate 512. According to this liquid crystal display device, therefore, a width W1 of an omitted portion of a display obliquely seen is smaller than that in the fifth embodiment, and the difference between the width of a pixel, obtained when the liquid crystal display device is squarely seen, and the width of a pixel, obtained when the device is obliquely seen, is further reduced.

[Table 2] shows the ratios of the effective widths of pixels, visually recognized when obliquely seen, to the widths of the pixels squarely seen in the liquid crystal display device of this embodiment. Similar to the device of the fifth embodiment in [Table 1], in this liquid crystal display device, the front-side substrate has a thickness of 1.1 mm, and the composite film has a thickness of 20 µm. In addition, the width of each pixel obliquely seen is the width of a pixel seen from a direction inclined with respect to the normal to the liquid crystal display device by 10°.

TABLE 2

| Width (mm) of Pixel Squarely Seen | Ratio (%) of Width of Pixel Obliquely Seen to Width of Pixel Squearely Seen |
|---|---|
| 10 | 100.0 |
| 5 | 99.9 |
| 1 | 99.7 |
| 0.5 | 99.3 |

As is apparent from the comparison between [Table 2] and [Table 1], in the liquid crystal display device of the sixth embodiment, the ratio of the effective width of a pixel, recognized when obliquely seen, to the width of the pixel squarely seen is higher than that in the fifth embodiment. Therefore, a display quality obtained when a display is obliquely seen can be made to be closer to a display quality obtained when the display is squarely seen, and a bright, clear display image can be obtained.

According to the liquid crystal display device of this embodiment, a width W2 of a dim shadow adjacent to an ON pixel can be decreased. Therefore, blurring of a display due to this shadow can be reduced.

[Seventh Embodiment]

Figure 22:
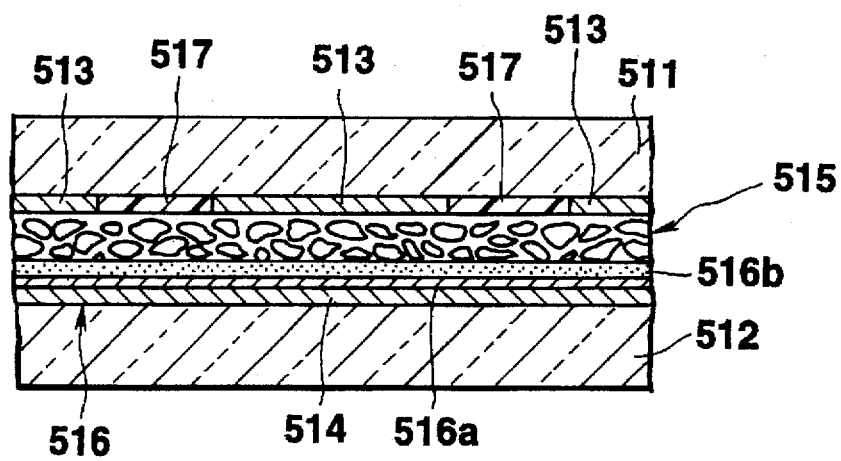
FIG. 22 is a sectional view showing the main part of a polymer dispersed liquid crystal display device according to the seventh embodiment of the present invention.

In the arrangement shown in FIG. 21, the reflecting member 516 is arranged on the inner surface of the rear-side substrate 512, and the transparent electrodes 514 are formed on the reflecting member 516. However, as shown in FIG. 22, electrodes 514 may be formed on the inner surface of a rear-side substrate 512, and a reflecting member 516 may be arranged on the electrodes 514.

In this embodiment, the reflecting member 516 may be composed of only a reflecting film 516a such as an Al film, or may be a scattering/reflecting plate composed of only an insulating film such as a white reflecting film consisting of BaSO$_4$ (barium sulfate). If the reflecting member 516 is to be composed of only a metal film, the reflecting member 516 may be formed to correspond to the respective electrodes 514 of the rear-side substrate 512 (i.e., may be patterned into the same shape as that of each electrode 514).

In this embodiment, since the reflecting member 516 is formed on the electrodes 514, the rear-side substrate 512 and the electrode 514 need not be transparent.

In this embodiment, since a light-shielding film 517 is formed on the inner surface of the front-side substrate 511, and the reflecting member 516 is formed on the electrodes 514 formed on the rear-side substrate 512, the distance from the light-shielding film 517 to the reflecting member 516 is shorter than that in the sixth embodiment by the thickness of the electrode 514. According to the embodiment, therefore, effects equivalent to or better than those of the sixth embodiment can be obtained.

[Eighth Embodiment]

Figure 23:
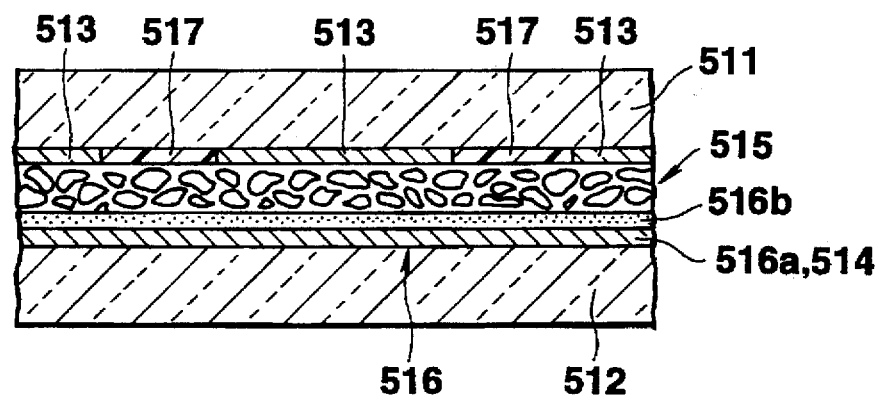
FIG. 23 is a sectional view showing the main part of a polymer dispersed liquid crystal display device according to the eighth embodiment of the present invention.

In the fifth to seventh embodiments, the transparent electrodes 514 and the reflecting member 516 are separately formed. However, for example, as shown in FIG. 23, a metal film 516a of a reflecting member 516 may be composed of a reflective, conductive member such as an aluminum film, and the reflecting member 516 may be patterned into the same shape as that of electrode 514 formed on a rear-side substrate 512, thereby letting the reflecting member 516 also serve as electrodes 514.

Other arrangements of the liquid crystal display device of the eighth embodiment are the same as those of the fifth to seventh embodiments. In this embodiment, the same effects as those of the seventh embodiment can be obtained. In addition, the step of forming the electrode 514 can be omitted. Therefore, a liquid crystal display device can be easily manufactured at a lower cost.

If a required reflectance can be ensured for the reflecting member 516, no fluorescent film is required.

[Ninth Embodiment]

Figure 24:
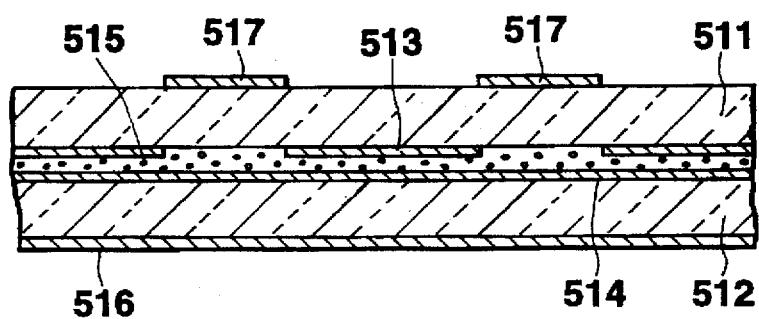
FIG. 24 is a sectional view showing the main part of a polymer dispersed liquid crystal display device according to the ninth embodiment of the present invention.

In the above embodiment, in order to shorten the distance between the light-shielding film and the reflecting film, the light-shielding film is arranged on the inner surface of the front-side substrate. However, as shown in FIG. 24, a light-shielding film may be arranged on the outer surface of a front-side substrate 511, similar to the conventional device. In this case, the thickness of the front-side substrate 511 and a rear-side substrate 512 is set to be 0.7 mm or less, preferably 0.55 mm, and more preferably 0.3 mm or more in terms of strength.

In the polymer dispersed liquid crystal display device using the thin transparent substrates 511 and 512, since the distance between a light-shielding film 517 and a reflecting plate 516 is short, a bright, clear display image can be obtained, similar to the fifth to eighth embodiments.

Although both the transparent substrates 511 and 512 are made to be thin, only the front-side substrate 511 may be made to be thin, and the reflecting member 516 may be formed on the inner surface of the rear-side substrate 512.

The liquid crystal display device of each embodiment described above is of a polymer dispersed type having the composite film as the liquid crystal layer between the substrates 511 and 512. However, the present invention can also be applied to a phase change (PC) effect liquid crystal device in which a liquid crystal layer capable of phase change is arranged between a pair of substrates. In this device, upon application of an electric field, the liquid crystal layer changes its phase between a cholesteric phase having a molecular alignment in which the molecules are randomly twisted in a plurality of directions and a nematic phase having a homeotropic alignment.

The liquid crystal display device of each embodiment is of a simple matrix type. However, the present invention can be applied to a liquid crystal display device of an active matrix type in which pixel electrodes, their active electrodes, and address and data signal supply lines are formed on one substrate, and counter electrodes opposing the pixel electrodes are formed on the other substrate, or a liquid crystal display device of a segment display type in which segments corresponding to display patterns are formed on one substrate.

[Tenth Embodiment]

In the each of the first to ninth embodiments, the present invention is applied to the polymer dispersed liquid crystal display device having the composite film with the sectional structure shown in FIG. 5. In general, if each liquid crystal domain in the composite film of the polymer dispersed liquid crystal display device is, for example, spherical, the interaction at the interface between the liquid crystal and the polymer is weak. If the interaction is weak, the effect of restoring the original random alignment in an OFF state of an electric field is weak. As a result, upon stopping application of an electric field, the liquid crystal molecules do not behave in accordance with a reverse process to the that of alignment upon application of an electric field. Although the liquid crystal molecules are randomly aligned, the molecules behave differently in the process of reaching the random alignment. For this reason, a change in transmittance (electrooptical characteristics) with respect to the voltage applied to the liquid crystal display device has a hysteresis, and the steepness of the characteristic curve is also poor. If the hysteresis of the electrooptical characteristics is large, the transmittance with respect to the applied voltage cannot be uniquely determined, resulting in difficulty in a gradation display. In addition, if the steepness of the electrooptical characteristic curve is poor, the contrast deteriorates.

Under the circumstances, in the tenth embodiment, there is provided a method of reducing the hysteresis of the electrooptical characteristics of a polymer dispersed liquid crystal display device.

Figure 25:
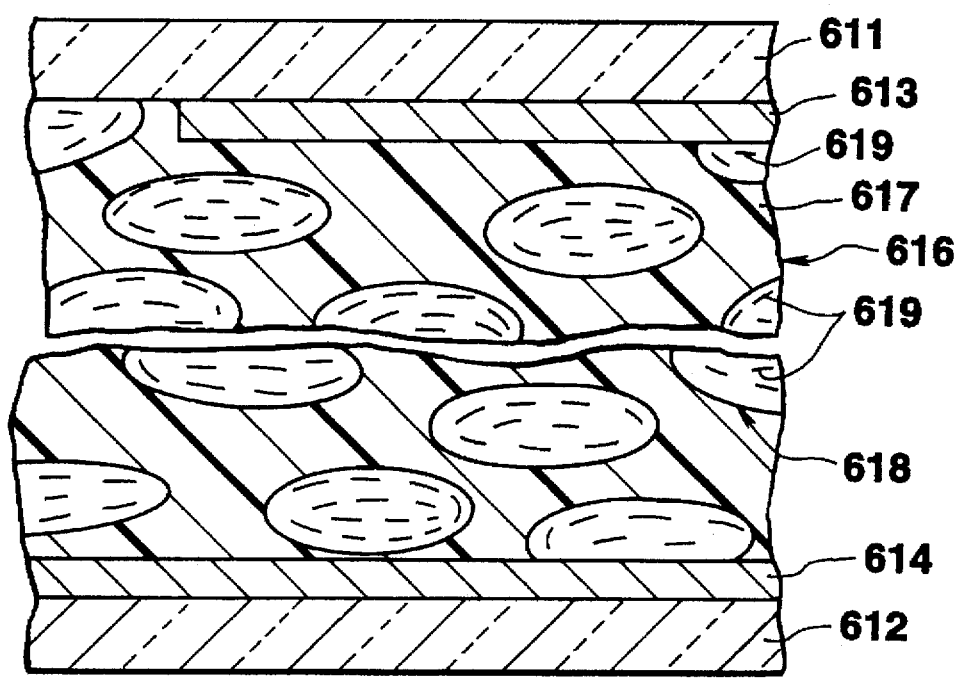
FIG. 25 is a sectional view showing the main part of a polymer dispersed liquid crystal display device according to the tenth embodiment of the present invention.

FIG. 25 is a schematic sectional view showing the main part of a polymer dispersed liquid crystal display device according to the tenth embodiment. As shown in FIG. 25, the polymer dispersed liquid crystal display device of this embodiment has a composite film 616 composed of a liquid crystal and a polymer resin in a cell formed by joining a pair of transparent substrates (e.g., glass substrates) 611 and 612, respectively having transparent electrodes 613 and 614, via a frame-like sealing member (not shown).

Figure 26:
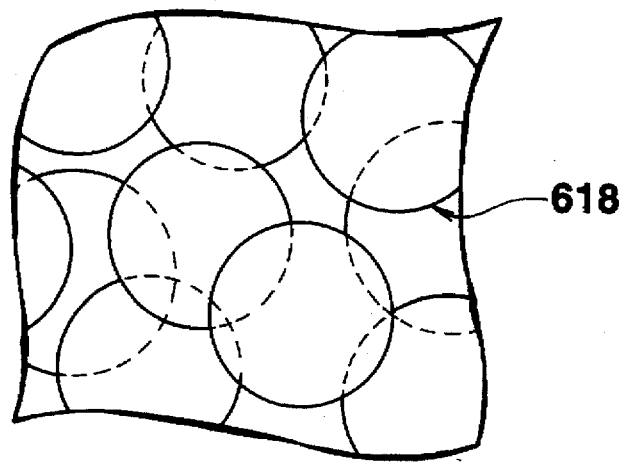
FIG. 26 is a plan view showing the arrangement of liquid crystal domains of the polymer dispersed liquid crystal display device according to the tenth embodiment of the present invention.

The composite film 616 has a structure in which liquid crystal capsules (liquid crystal domains), each having a flat or elliptic section, are dispersed in a polymer resin 617. As shown in FIG. 26, each liquid crystal capsule 618 has a circular shape when viewed from the front surface of the substrate 611.

The section of each liquid crystal capsule 618 has a thickness (minor axis) of 0.5 µm to 3 µm and a length (major axis) of 2 µm to 8 µm. The thickness is preferably ½ or less the length. The upper and lower surfaces of each liquid crystal capsule 618 have almost parallel or gradually curved shapes with respect to the substrates 611 and 612.

In the polymer dispersed liquid crystal display device having the above arrangement, the upper and lower surfaces of the liquid crystal capsule 618 are formed into almost parallel or gradually curved shapes with respect to the substrates 611 and 612. For this reason, while no voltage is applied between the transparent electrodes 613 and 614, liquid crystal molecules 619 are aligned along the interface between the polymer resin and the liquid crystal. That is, the average aligning direction of the liquid crystal molecules is almost parallel to the substrates 611 and 612.

In this state, owing to the difference between the refractive index of the liquid crystal with respect to the propagating direction of light and the refractive index of the polymer resin 617, incident light is reflected by the interface between the liquid crystal and the polymer resin 617. In addition, the incident light is scattered by the liquid crystal molecules 619 themselves. For this reason, the display becomes dim (dark).

When a voltage equal to or higher than a threshold voltage is applied between the transparent electrodes 613 and 614, the liquid crystal molecules 619 are uniformly aligned in a direction almost parallel to an electric field, i.e., almost perpendicular to the substrates 611 and 612. As a result, the refractive index of the liquid crystal with respect to the propagating direction of light becomes almost equal to the refractive index of the polymer resin 617, and hence incident light is transmitted through the composite film 616 under almost no influence of the light scattering effect. The screen becomes transparent (bright).

As described above, while no electric field is applied, the liquid crystal molecules 619 are uniformly aligned in a direction almost parallel to the substrates 611 and 612. In this state, the tilt angles of the molecules are almost the same. In addition, the thicknesses of the liquid crystal capsules 618 are almost the same, and the intensity of the applied electric field is almost uniform regardless of the place where the electric field is applied. Therefore, when an electric field is applied in this state, the liquid crystal molecules 619 uniformly behave in accordance with the applied electric field to simultaneously change to an aligned state in a direction perpendicular to the substrates 611 and 612.

While an electric field is applied, the liquid crystal molecules 619 are aligned in a direction almost perpendicular to the substrates 611 and 612, and their tilt angles are almost the same. Therefore, if the electric field is nullified in this state, the liquid crystal molecules 619 almost uniformly behave to simultaneously change to an aligned state in a direction almost parallel to the substrates 611 and 612.

Therefore, the hysteresis of the relationship between a transmittance T (maximum transmittance=100%) of the polymer dispersed liquid crystal display device and the voltage applied between the transparent electrodes 613 and 614 is small, and high steepness is ensured.

Figure 27A:
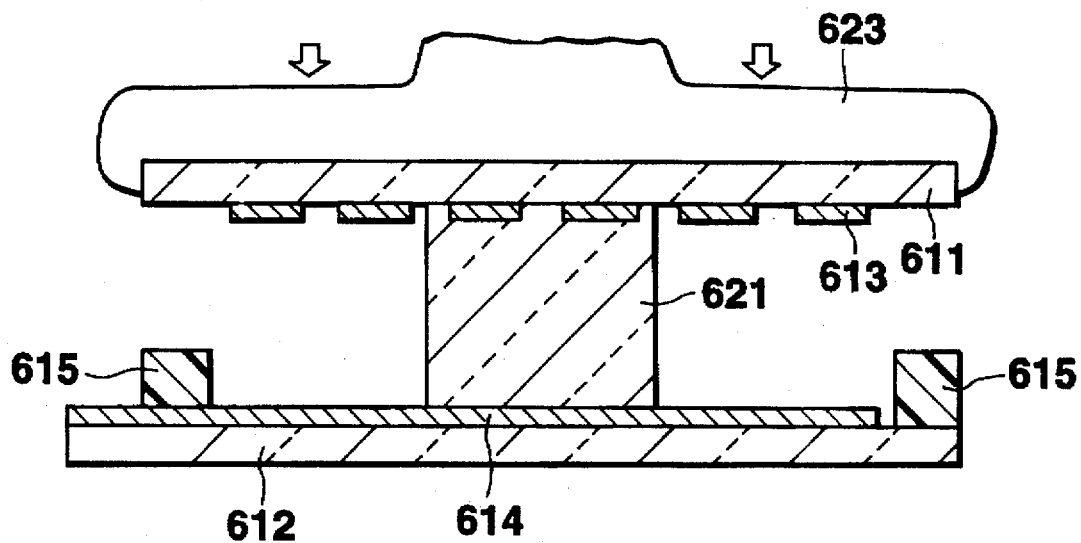
FIGS. 27A and 27B are sectional views for explaining a method of manufacturing the polymer dispersed liquid crystal display device shown in FIG. 25.
Figure 27B:
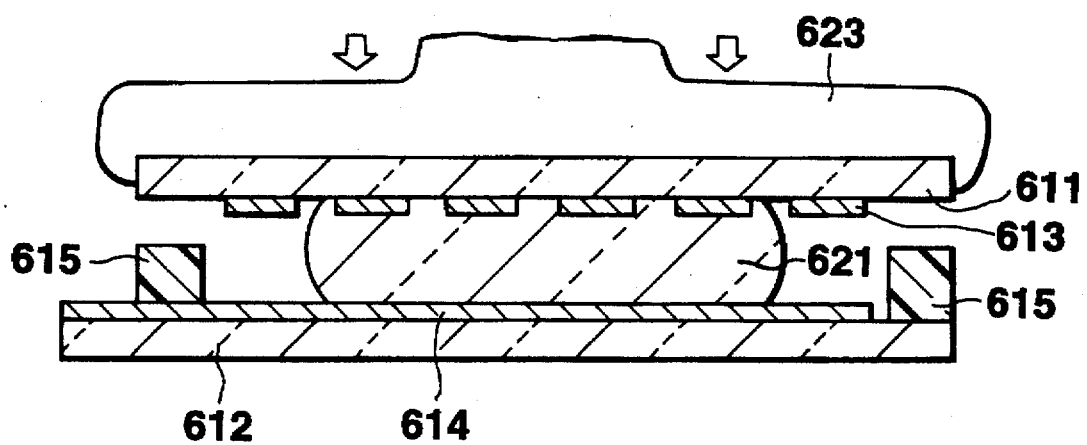

A method of manufacturing the polymer dispersed liquid crystal display device having the flat liquid crystal capsules 618 shown in FIG. 25 will be described next with reference to FIGS. 27A and 27B.

First, a nematic liquid crystal and a polymeric material (a monomer, an oligomer, or the like) are mixed together sufficiently to form a solution mixture 621. If the ratio of the liquid crystal is too low, difficulty is posed in scattering light. If the ratio of the liquid crystal is too high, the composite film 616 has a structure in which the liquid crystal is filled in the polymer resin 617 in the form of a network. In this case, no liquid crystal capsules are obtained. Therefore, the weight ratio of the nematic liquid crystal to the composite film is preferably set to be 40 to 60%. As shown in FIG. 27A, this solution mixture 621 is coated on the substrate 612, on which the transparent electrodes 614 and a sealing member 615 are formed, by a printing method or the like. The solution mixture has a thickness about two to four times that of the manufactured composite film 616 (the height of the sealing member 615), and a volume slightly larger than that of the manufactured composite film 616. Note that a spacer (not shown) may be spread on the substrate 612, as needed. In addition, an opening is formed in the sealing member 615 to allow the solution mixture 621 to escape outside.

Subsequently, the substrate 611 having the transparent electrodes 613 formed thereon is arranged on the layer of the solution mixture 621 by using a holding member 623.

Relatively weak ultraviolet rays are radiated on the solution mixture 621 to polymerize the polymeric material so as to transform it into a polymer resin.

In the process of polymerization, the liquid crystal molecules 619 are separated from the polymer resin 617, and the spherical liquid crystal capsules (liquid crystal aggregates) 618, each having a diameter of about 2 to 4 µm, are dispersed and formed in the layer of the solution mixture 621 (the composite film 616 in the process of formation).

When ultraviolet rays are radiated for a predetermined period of time to form the spherical liquid crystal capsules 618, the substrate 611 is pressed by using the holding member 623 to apply a pressure between the substrates 611 and 612, thus gradually pressing the layer of the solution mixture 621, as shown in FIG. 17B. Ultraviolet rays are kept radiated while the layer is pressed. With this process, the spherical liquid crystal capsules 618 are also pressed gradually to gradually become flat.

If the solution mixture 621 overflows in the process of pressing the composite film 616, pressing and radiation of ultraviolet rays are continued while the overflowing portion is removed as needed.

The overflowing portion of the solution mixture 621 is wiped out immediately before the substrate 611 reaches the upper end of the sealing member 615. Thereafter, an adhesive is coated on the upper surface of the sealing member 615, and the sealing member 615 is joined to the substrate 611. In this case, the distance between the substrates 611 and 612 is kept at a desired value by a spacer.

Radiation of ultraviolet rays is continued to completely harden the polymer resin 617. Thereafter, the opening of the sealing member 615 is sealed by using a photo-setting resin or the like, thereby completing a polymer dispersed liquid crystal display device.

According to this manufacturing method, the liquid crystal capsule 618 has a thickness of about ½ to ¼ that of a spherical liquid crystal capsule generally manufactured, and hence has a flat shape. Therefore, as described above, the upper and lower surfaces of each liquid crystal capsule become almost parallel to the substrates 611 and 612 or gradually curved surfaces. For this reason, the electrooptical characteristics of the polymer dispersed liquid crystal display device manufactured by this manufacturing method have small hysteresis and excellent steepness.

In the above embodiment, the volume of the solution mixture 621 is set to be slightly larger than that of the composite film 616 so as not to waste any part of the liquid crystal and of the polymer resin. However, the volume of the solution mixture 621 may be arbitrarily set.

In the above embodiment, a polymer having photopolymerization properties is used a polymeric material. However, a polymer having thermopolymerization properties may be used. In this case, the layer of the solution mixture 621 is pressed while heat is applied thereto.

In the above embodiment, application of a pressure is started when the liquid crystal capsules 618 are formed. However, application of a pressure may be started at the same time when radiation of ultraviolet rays is started.

In the above embodiment, the flat liquid crystal capsules 618 are formed by pressing the composite film 616. However, other manufacturing methods may be used.

For example, flat liquid crystal capsule 618 are formed in advance, and a solution mixture of the capsules and a polymeric material is coated on a substrate. Thereafter, the polymeric material is polymerized, thereby forming a composite film 616 containing the flat liquid crystal capsules.

The flat liquid crystal capsules 618 may be formed as follows. For example, in the final step of coacervation (encapsulization), the wall films of the liquid crystal capsules 618 may be hardened by adding a hardener such as an aldehyde while the liquid crystal capsules 618 are pressed.

The above description is associated with the polymer dispersed liquid crystal display device of the type using the liquid crystal capsules 618. However, the present invention is not applied to the type using the liquid crystal capsules 618, but can also be applied to a polymer dispersed liquid crystal display device of a type in which a liquid crystal is filled in a polymer resin in the form of a network.

In this case, relatively flat liquid crystal aggregates (liquid crystal domains) can be formed, and hence a polymer dispersed liquid crystal display device having excellent electrooptical characteristics can be manufactured by the same manufacturing method as that described above, except that the solution mixture 621 is composed of a liquid crystal and a polymeric material such that the weight ratio of the liquid crystal to the composite film 616 is set to be 60 to 80%.

The present invention is not limited to the above embodiment but may be variously modified. For example, in the above embodiment, a nematic liquid crystal is used. However, a cholesteric liquid crystal, a smectic liquid crystal, a ferroelectric liquid crystal, a liquid crystal of a guest-host type containing a dye, or the like may be used.

In addition, a reflecting film (a reflecting plate or a reflecting member) like the one described in detail in the first to ninth embodiments may be arranged in the device to obtain a reflection liquid crystal display device. Furthermore, a light coloring film containing a fluorescent material like the one described in detail in the second and third embodiment may be arranged in the device to obtain a color liquid crystal display device. Moreover, a light-shielding film may be arranged in the device. The present invention can also be applied to a polymer dispersed liquid crystal display device of an active matrix type.

In the above embodiment, the liquid crystal capsules are pressed to have flat shapes. The present invention is not limited to this method, but other methods may be used as long as the tilt angles of liquid crystal molecules can be made to be uniform. For example, the same effect can be obtained even if liquid crystal capsules are formed to have columnar shapes aligned in the same direction.

The present invention is not limited to the first to tenth embodiments but may be variously modified and applied.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A liquid crystal display device comprising:
    first and second substrates having opposing inner surfaces and arranged at a predetermined distance from each other;
    a liquid crystal layer, arranged between said first and second substrates, for controlling scattering and transmission of light;
    a first electrode arranged on the side of the inner surface of said first substrate;
    a second electrode arranged between the inner surface of said second substrate and said liquid crystal layer and having at least a portion opposing said first electrode;
    a fluorescent film arranged between said second substrate and said liquid crystal layer and comprised of a film including a fluorescent material, the fluorescent film emitting a fluorescent light with a specific wavelength range by energy of absorbed light passing through said liquid crystal layer; and
    reflecting means for reflecting the fluorescent light, said reflecting means arranged between said second substrate and said fluorescent film;
    wherein said second electrode comprises at least a portion of said reflecting means, and a surface of said second electrode reflects light transmitted through said liquid crystal layer; and
    wherein said liquid crystal layer includes a material which transmits light with a wavelength band corresponding to a wavelength of a fluorescent light emitted from said fluorescent material, and absorbs light with other wavelength bands.

2. A device according to claim 1, wherein said fluorescent film contains a phosphorescent material.

3. A device according to claim 1, wherein said fluorescent film and said reflecting means comprise at least one of a laminated film comprised of a resin film including a fluorescent material and a reflective film, and a laminated film comprised of a resin film including a fluorescent material and a phosphorescent material and a reflective film.

4. A device according to claim 1, wherein said second substrate comprises a flexible film.

5. A device according to claim 1, wherein said liquid crystal layer comprises a composite film comprised of a liquid crystal and a polymer resin.

6. A device according to claim 1, wherein said liquid crystal layer comprises a polymer dispersed liquid crystal layer formed by dispersing aggregates of a liquid crystal in a polymer resin, and said polymer resin allows substantially uniform alignment of molecules of the liquid crystal while no electric field is applied.

7. A liquid crystal display device comprising:
    first and second transparent substrates having opposing inner surfaces arranged to oppose each other;
    a liquid crystal layer, arranged between said first and second transparent substrates, for controlling scattering and transmission of light;
    a first electrode arranged on the inner surface of said first transparent substrate;
    a second electrode arranged on the inner surface of said second transparent substrate;
    a fluorescent film for emitting a fluorescent light with a specific wavelength range by energy of absorbed light passing through said liquid crystal layer, said fluorescent film arranged between said second substrate and said liquid crystal layer and comprised of a film including a fluorescent material;
    reflecting means for reflecting the fluorescent light, said reflecting means arranged on said second substrate; and
    a light-shielding film, arranged in a non-display region on an outer surface of said first substrate, for shielding light, the non-display region including a portion other than a portion where said first and second electrodes oppose each other;
    wherein said second electrode comprises at least a portion of said reflecting means, and a surface of said second electrode reflects light transmitted through said liquid crystal layer; and
    wherein said liquid crystal layer includes a material which transmits light with a wavelength band corresponding to a wavelength of a fluorescent light emitted from said fluorescent material, and absorbs light with other wavelength bands.

8. A device according to claim 7, wherein said light-shielding film comprises a light-scattering or light-absorbing film.

9. A liquid crystal display device comprising:
    first and second substrates having opposing inner surfaces arranged at a predetermined distance from each other;
    a liquid crystal layer, arranged between said first and second substrates, for controlling scattering and transmission of light;
    a first electrode arranged on the inner surface of said first substrate;
    a second electrode arranged on the side of the inner surface of said second substrate and having at least a portion opposing said first electrode;
    a fluorescent film arranged between said second substrate and said liquid crystal layer and comprised of a film including a fluorescent material, the fluorescent film emitting a fluorescent light with a specific wavelength range by energy of absorbed light passing through said liquid crystal layer; and reflecting means for reflecting the fluorescent light, said reflecting means arranged on said second electrode.

10. A liquid crystal display device comprising:

first and second substrates having opposing inner surfaces and arranged at a predetermined distance from each other;

a liquid crystal layer, arranged between said first and second substrates, for controlling scattering and transmission of light;

a first electrode arranged on the side of the inner surface of said first substrate;

a second electrode arranged between the inner surface of said second substrate and said liquid crystal layer and having at least a portion opposing said first electrode;

a fluorescent film arranged between said second substrate and said liquid crystal layer and comprised of a film including a fluorescent material and a material which transmits light with a wavelength band corresponding to a wavelength of a fluorescent light emitted from said fluorescent material, and absorbs light with other wavelength bands, the fluorescent film emitting a fluorescent light with a specific wavelength range by energy of absorbed light passing through said liquid crystal layer; and reflecting means for reflecting the fluorescent light, said reflecting means arranged between said second substrate and said fluorescent film.

11. A liquid crystal display device comprising:

first and second substrates having opposing inner surfaces and arranged at a predetermined distance from each other;

a liquid crystal layer, arranged between said first and second substrates, for controlling scattering and transmission of light, a first electrode arranged on the side of the inner surface of said first substrate;

a second electrode arranged between the inner surface of said second substrate and said liquid crystal layer and having at least a portion opposing said first electrode;

a fluorescent film arranged between said first and second substrates, and comprised of a film including a fluorescent material, the fluorescent film emitting a fluorescent light with a specific wavelength range by energy of absorbed light passing through said liquid crystal layer;

reflecting means for reflecting the fluorescent light, said reflecting means arranged between said second substrate and said fluorescent film; and wherein the liquid crystal layer includes a material which transmits light with a wavelength band corresponding to a wavelength of a fluorescent light emitted from said fluorescent material, and absorbs light with other wavelength bands.

12. A liquid crystal display device comprising:

first and second substrates having opposing inner surfaces and arranged at a predetermined distance from each other;

a liquid crystal layer, arranged between said first and second substrates, for controlling scattering and transmission of light;

a first electrode arranged on the side of the inner surface of said first substrate;

a second electrode arranged between the inner surface of said second substrate and said liquid crystal layer and having at least a portion opposing said first electrode;

a fluorescent film arranged between said second substrate and said liquid crystal layer and comprised of a film including a fluorescent material, the fluorescent film emitting a fluorescent light with a specific wavelength range by energy of absorbed light passing through said liquid crystal layer; and reflecting means for reflecting the fluorescent light, said reflecting means arranged between said second substrate and said fluorescent film;

wherein said second electrode is formed on said reflecting means through an insulating layer; and wherein said liquid crystal layer includes a material which transmits light with a wavelength band corresponding to a wavelength of a fluorescent light emitted from said fluorescent material, and absorbs light with other wavelength bands.

13. A device according to claim 12, wherein said reflecting means is formed on said second substrate, and said second electrode is formed on said reflecting means through said fluorescent film as said insulating layer.

14. A device according to claim 12, wherein said fluorescent film and said reflecting means comprise a laminated film which is comprised of a resin film including a fluorescent material and a reflective film.

15. A device according to claim 12, wherein said liquid crystal layer comprises a composite film which is comprised of a liquid crystal and a polymer resin.

16. A device according to claim 12, wherein said fluorescent film includes a material which transmits light with a wavelength band corresponding to a wavelength of a fluorescent light emitted from said fluorescent material, and absorbs light with other wavelength bands.

17. A device according to claim 12, further comprising a light-shielding film, arranged in a non-display region on an outer surface of said first substrate, for shielding light, the non-display region including a portion other than a portion where said first and second electrodes oppose each other.

18. A liquid crystal display device comprising:

first and second substrates having opposing inner surfaces and arranged at a predetermined distance from each other;

a liquid crystal layer, arranged between said first and second substrates for controlling scattering and transmission of light;

a plurality of first electrodes arranged on the side of the inner surface of said first substrate in a matrix form;

a plurality of active elements arranged on the side of the inner surface of said first substrate and connected to said first electrodes;

at least one second electrode arranged between the inner surface of said second substrate and said liquid crystal layer and having at least a portion opposing said first electrode;

a fluorescent film arranged between said second substrate and said liquid crystal layer and comprised of a film including a fluorescent material, the fluorescent film emitting a fluorescent light with a specific wavelength range by energy of absorbed light passing through said liquid crystal layer; and reflecting means for reflecting the fluorescent light, said reflecting means arranged between said first and second substrates; and wherein said liquid crystal layer includes a material which transmits light with a wavelength band corresponding to a wavelength of a fluorescent light emitted from said fluorescent material, and absorbs light with other wavelength bands.

19. A liquid crystal display device comprising:

first and second substrates having opposing inner surfaces and arranged at a predetermined distance from each other;

a liquid crystal layer, arranged between said first and second substrates, for controlling scattering and transmission of light;

a first electrode arranged on the side of the inner surface of said first substrate;

a second electrode arranged between the inner surface of said second substrate and said liquid crystal layer and having at least a portion opposing said first electrode;

a fluorescent film arranged between said second substrate and said liquid crystal layer and comprised of a film including a fluorescent material, the fluorescent film emitting a fluorescent light with a specific wavelength range by energy of absorbed light passing through said liquid crystal layer; and a reflecting member for reflecting the fluorescent light, said reflecting member being arranged between said second substrate and said fluorescent film; and wherein said second electrode is formed on said second substrate, and said reflecting member is formed on said second electrode.

20. A liquid crystal display device comprising:

first and second transparent substrates having opposing inner surfaces arranged to oppose each other;

a liquid crystal layer, arranged between said first and second transparent substrates, for controlling scattering and transmission of light;

a first electrode arranged on the inner surface of said first transparent substrate;

a second electrode arranged on the inner surface of said second transparent substrate;

a fluorescent film for emitting a fluorescent light with a specific wavelength range by energy of absorbed light passing through said liquid crystal layer, said fluorescent film arranged between said second substrate and said liquid crystal layer and comprised of a film including a fluorescent material;

a reflecting member for reflecting the fluorescent light, said reflecting member being arranged on said second substrate; and a light-shielding film, arranged in a non-display region on an outer surface of said first substrate, for shielding light, the non-display region including a portion other than a portion where said first and second electrodes oppose each other; and wherein said second electrode is formed on said second substrate, and said reflecting member is formed on said second electrode.

* * * * *